(12) United States Patent
Koerner et al.

(10) Patent No.: US 12,287,656 B2
(45) Date of Patent: Apr. 29, 2025

(54) CONTROL SYSTEMS FOR USE IN CRITICAL POWER APPLICATIONS

(71) Applicant: Caeli, LLC, Dallas, TX (US)

(72) Inventors: Matthew Douglas Koerner, Ashburn, VA (US); Brandon McDaniel, Flower Mound, TX (US); John A. Musilli, Jr., San Diego, CA (US)

(73) Assignee: Caeli, LLC, Dallas, TX (US)

( * ) Notice: Subject to any disclaimer, the term of this patent is extended or adjusted under 35 U.S.C. 154(b) by 295 days.

(21) Appl. No.: 17/805,859

(22) Filed: Jun. 7, 2022

(65) Prior Publication Data

US 2022/0390966 A1 Dec. 8, 2022

Related U.S. Application Data

(60) Provisional application No. 63/208,381, filed on Jun. 8, 2021.

(51) Int. Cl.
*G05D 7/06* (2006.01)
(52) U.S. Cl.
CPC .................. *G05D 7/0676* (2013.01)
(58) Field of Classification Search
CPC ..................................... G05D 7/0676
See application file for complete search history.

(56) References Cited

U.S. PATENT DOCUMENTS

2005/0099770 A1 5/2005 Fink
2011/0094242 A1 4/2011 Koerner
2011/0154842 A1 6/2011 Heydari et al.
2011/0167814 A1 7/2011 Haynes
2011/0239683 A1 10/2011 Czamara et al.
2012/0286522 A1 11/2012 Stahlkopf et al.
2013/0047653 A1 2/2013 Keisling et al.
2015/0162801 A1* 6/2015 Czamara ............ H05K 7/20745
290/52

(Continued)

FOREIGN PATENT DOCUMENTS

CN 102330603 A * 1/2012 ................ F02C 1/04
WO 2022236321 A1 11/2022

OTHER PUBLICATIONS

MAN Energy Solutions, Urban Energy, https://www.man-es.com/docs/default-source/energy-storage/man-es_I2-broch_urban-energy_preview.pdf?sfvrsn=e9be4f6d_18, 86224 Augsburg, Germany, 32 pgs.

(Continued)

*Primary Examiner* — Suresh Suryawanshi

(57) ABSTRACT

A method includes receiving temperature measurements from multiple temperature sensors in a power supply system that includes multiple coils arranged in a series downstream of a turbine, each coil configured to receive thermal energy from an air stream exhausted from the turbine as the air stream moves toward a data center, each coil associated with at least one fluid loop. The method also includes using a first subset of the temperature measurements to determine a blended fluid mix from a primary fluid path and a heated fluid reservoir in order to obtain a predetermined leaving fluid temperature at a first coil of the multiple coils. The method further includes controlling a position of one or more valves associated with the primary fluid path and the heated fluid reservoir to achieve the determined blended fluid mix.

20 Claims, 15 Drawing Sheets

(56) References Cited

U.S. PATENT DOCUMENTS

2022/0117120 A1* 4/2022 Koerner ............... H02J 15/006

OTHER PUBLICATIONS

Highview Power, "Cryogenic energy storage", copyright 2021, 5 pgs. https://highviewpower.com/technology/.

Linde Engineering, "Modular CO2 purification and liquefaction plants", copyright 2021, 4 pgs., https://www.linde-engineering.com/en/process-plants/co2-plants/co2-purification-and-liquefaction/modular-co2-plants/index.html.

Energy Storage Association, "Mechanical Energy Storage", copyright 2021, 5 pgs., https://energystorage.org/why-energy-storage/technologies/mechanical-energy-storage/#:~:text=Compressed%20Air%20Energy%20Storage%20(CAES,demand%20(peak%20load)%20periods.

IEM Power Systems, "About IEM Power Systems", copyright 2017, 3 pgs., https://www.iemps.com/company/about-iem-power-systems.

SCRIBD, "Turbo Expanders for Cold Production and Energy Recovery", copyright 2016, 16 pgs., https://www.scribd.com/document/452458382/Turbo-Expanders-for-cold-production-and-energy-recovery-booklet-pdf.

Hepburn, et al., "The technological and economic prospects for CO2 utilization and removal", https://www.nature.com/articles/s41586-019-1681-6#Tab2, Nov. 6, 2019, 11 pgs.

SCRIBD, "HITECH PowerPRO2-2016", copyright 2016, 3 pgs., https://www.scribd.com/document/347266893/HITEC-PowerPRO2700-2016-pdf.

ScienceDirect, "Sustainable hydrocarbon fuels by recycling CO2 and H2O with renewable or nuclear energy", copyright 2010, 23 pgs., https://www.sciencedirect.com/science/article/abs/pii/S1364032110001942?via%3Dihub.

ScienceDirect, "Production of cement-free construction blocks from industry wastes", copyright 2016, 3 pgs., https://www.sciencedirect.com/science/article/abs/pii/S0959652616311374.

Blue Planet Systems, "Permanent Carbon Capture", copyright 2021, 4 pgs., http://www.blueplanet-ltd.com/#technology.

Carbon Cure, "Sustainability in Concrete Makes Good Business Sense", copyright 2021, 9 pgs., https://www.carboncure.com/concrete producers/.

Solidia, "Solidia Solutions", copyright 2021, 1 pg., https://www.solidiatech.com/solutions.html.

Calix Global, "Cement & lime", copyright 2021, 3 pgs., https://www.calix.global/industries/cement-and-lime/.

Vox, "These uses of CO2 could cut emissions—and make trillions of dollars", copyright 2019, 18 pgs., https://www.vox.com/energy-and-environment/2019/11/13/20839531/climate-change-industry-co2-carbon-capture-utilization-storage-ccu.

Forbes, "Carbon Engineering—Taking CO2 Right Out of the Air to Make Gasoline", copyright 2019, 6 pgs., https://www.forbes.com/sites/jamesconca/2019/10/08/carbon-engineering-taking-co2-right-out-of-the-air-to-make-gasoline/?sh=370a22c813cc.

Department of Energy, "2021 Climate Adaptation and Resilience Plan", copyright 2021, 7 pgs., https://www.energy.gov.

Chart, "Bulk Storage Tanks", copyright 2021, 11 pgs., https://www.chartindustries.com/Products/Bulk-Cryogenic-Tanks.

Universal Industrial Gases, "Large Tank Specifications", copyright 2003, 2 pgs., http://www.uigi.com/largetanks.html.

Integ Systems Corporation, "Critical Power and Environmental Specialists", copyright 2021, 4 pgs., https://www.integsystemscorp.com/pdf/Integ_Systems_Corp_Brochure.pdf.

Turbogaz, "Expander-Generator", copyright 2021, 5 pgs., https://turbogaz.com.ua/en/equipment/expander-generator.

Phoenix Equipment Corporation, "3.1 MW Steam Turbine Generator Set for Sale" 1 pg., https://www.phxequip.com/Multimedia/documents/plants/steam-turbine-generator-murray-3-1-mw-173.pdf.

Phoenix Equipment Corporation, "8 Steam Turbines & Steam Turbine Generators", copyright 2021, 7 pgs., https://www.phxequip.com/subcategory.222.0/power-generation-generators-steam-turbine-generators.aspx.

LNG Global, "WSCE Mini LNG Plants", copyright 2021, 5 pgs., https://www.lngglobal.com/mini-lng-plant-overview.

MAN Energy Solutions, "MGT6000 Single Shaft", https://www.man-es.com/docs/default-source/oil-and-gas-process-industry-documents/mgt6000-1s-(single-shaft).pdf?sfvrsn=de156070_8, 86224 Augsburg, Germany, 4 pgs.

Science Based Targets, "Guidance for ICT Companies Setting Science Based Targets", https://sciencebasedtargets.org/resources/legacy/2020/04/GSMA_IP_SBT-report_WEB-SINGLE.pdf, 25 pgs.

PS&C Power, "Hybrid Rotary Uninterruptible Power Supply; Series XC", copyright 2021, 4 pgs., https://pscpower.com/large-hybrid-rotary-ups/.

SSS Gears Limited, "Power Generation", copyright 2021, 2 pgs., http://www.sssclutch.com/en/power-generation/.

Stirling Cryogenics, "Liquid Air Production Systems", copyright 2021, 4 pgs., https://www.stirlingcryogenics.eu/en/products/liquid-air-production-systems.

Calnetix Technologies, "Case Studies/The Heat to Power Solution" copyright 2021, 5 pgs., https://www.calnetix.com/system-integration/heat-power-systems.

International Search Report and Written Opinion issued Jan. 19, 2022 regarding International Application No. PCT/US2021/071804, 7 pages.

International Search Report and Written Opinion issued Aug. 30, 2022 regarding International Application No. PCT/US2022/072830, 9 pages.

Extended European Search Report issued Feb. 11, 2025 regarding Application No. 22821252.8, 9 pages.

* cited by examiner

CONTROL SYSTEMS FOR USE IN CRITICAL POWER APPLICATIONS

CROSS-REFERENCE TO RELATED APPLICATIONS AND PRIORITY CLAIM

This application claims priority under 35 U.S.C. § 119(e) to U.S. Provisional Patent Application No. 63/208,381 filed on Jun. 8, 2021, which is hereby incorporated by reference in its entirety.

TECHNICAL FIELD

Embodiments of the present disclosure relate to critical power supply applications and, in particular, to control systems and methods for use in a critical power supply system.

BACKGROUND

Facilities that operate power critical applications require a constant or near constant supply of electricity to ensure that their power critical applications can always be in operation. These facilities typically use a utility grid as a primary source of electricity and rely on one or more uninterruptible (or near uninterruptible) power supply or power generation systems to provide their applications with power in the event there is a loss of power from the primary utility grid. In generating power for use by such facilities, there are multiple components (e.g., heaters, turbines, fans, pumps, and the like) whose operations must be carefully coordinated and controlled to ensure proper operation of the overall systems.

SUMMARY

This disclosure provides control systems and methods for use in a critical power supply system.

In a first embodiment, a method includes receiving temperature measurements from multiple temperature sensors in a power supply system that includes multiple coils arranged in a series downstream of a turbine, each coil configured to receive thermal energy from an air stream exhausted from the turbine as the air stream moves toward a data center, each coil associated with at least one fluid loop. The method also includes using a first subset of the temperature measurements to determine a blended fluid mix from a primary fluid path and a heated fluid reservoir in order to obtain a predetermined leaving fluid temperature at a first coil of the multiple coils. The method further includes controlling a position of one or more valves associated with the primary fluid path and the heated fluid reservoir to achieve the determined blended fluid mix.

In a second embodiment, a device includes a memory configured to store instructions and a processor operably connected to the memory. The processor is configured, when executing the instructions, to: receive temperature measurements from multiple temperature sensors in a power supply system that includes multiple coils arranged in a series downstream of a turbine, each coil configured to receive thermal energy from an air stream exhausted from the turbine as the air stream moves toward a data center, each coil associated with at least one fluid loop; use a first subset of the temperature measurements to determine a blended fluid mix from a primary fluid path and a heated fluid reservoir in order to obtain a predetermined leaving fluid temperature at a first coil of the multiple coils; and control a position of one or more valves associated with the primary fluid path and the heated fluid reservoir to achieve the determined blended fluid mix.

In a third embodiment, a non-transitory computer readable medium includes a plurality of instructions that, when executed by at least one processor, is configured to cause the at least one processor to: receive temperature measurements from multiple temperature sensors in a power supply system that includes multiple coils arranged in a series downstream of a turbine, each coil configured to receive thermal energy from an air stream exhausted from the turbine as the air stream moves toward a data center, each coil associated with at least one fluid loop; use a first subset of the temperature measurements to determine a blended fluid mix from a primary fluid path and a heated fluid reservoir in order to obtain a predetermined leaving fluid temperature at a first coil of the multiple coils; and control a position of one or more valves associated with the primary fluid path and the heated fluid reservoir to achieve the determined blended fluid mix Other technical features may be readily apparent to one skilled in the art from the following figures, descriptions, and claims.

DETAILED DESCRIPTION

The figures discussed below and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, uninterruptible power supply systems are often used to provide facilities that operate power critical applications with power in the event there is a loss of power from the primary utility grid. These facilities typically use a utility grid as a primary source of electricity and rely on one or more uninterruptible power supply systems, near uninterruptible power supply systems, or power generation systems to provide their applications with power in the event there is a loss of power from the primary utility grid. In generating power for use by such facilities, there are multiple components (e.g., heaters, turbines, fans, pumps, and the like) whose operations must be carefully coordinated and controlled to ensure proper operation of the overall systems.

To address these and other issues, embodiments of the present disclosure provide control systems and methods for controlling multiple components that are operated in uninterruptible power supply systems, near uninterruptible power supply systems, or power generation systems. Such control systems and methods ensure that the overall systems operate efficiently and in a manner that ensures power delivery to critical applications. Other benefits will be apparent to those of skill in the art.

Figure 1A:
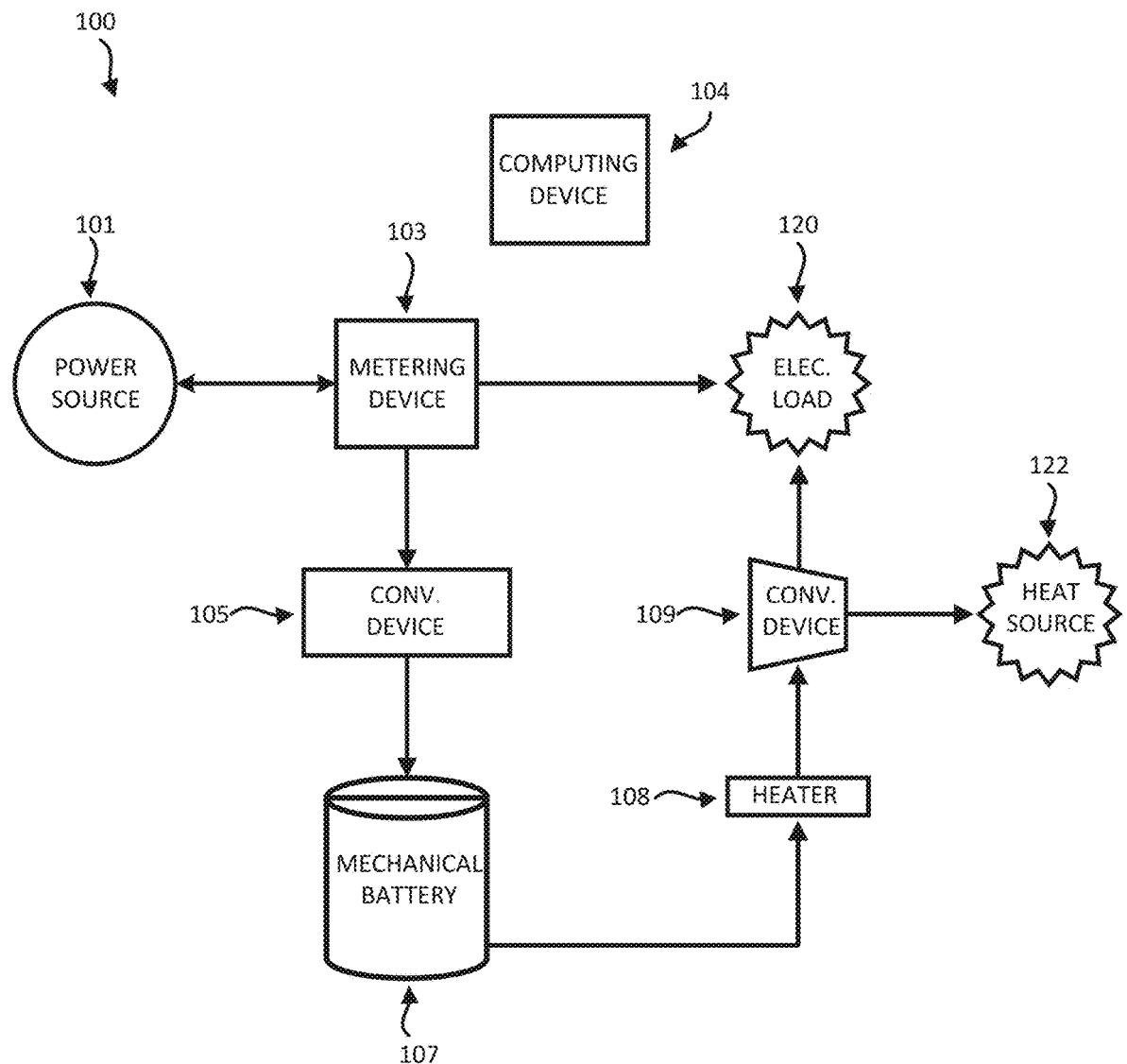
FIG. 1A illustrates an example power supply and cooling system in which one or more control systems can be employed according to various embodiments of the present disclosure.

FIG. 1A illustrates an example power supply and cooling system 100 in which one or more control systems can be employed according to various embodiments of the present disclosure. The embodiment of the system 100 shown in FIG. 1A is for illustration only. Other embodiments of the system 100 could be used without departing from the scope of this disclosure.

The system 100 may include a power source 101 that creates or receives electrical energy. The power source 101 may create or receive electrical energy from a renewable energy source. The power source 101 may create or receive electrical energy from wind power, solar power, tidal/wave power, or any other renewable energy source (the utility grid could also provide power through the same input). The system 100 may also receive electrical energy from a utility power grid. The utility power grid and the power source 101 may provide electrical energy to the system 100 through a same input of the system 100.

The system 100 may include a metering device 103. The metering device 103 may receive the electrical energy created or received by the power source 101, for example, during periods of time where the electrical energy is readily available and/or cost efficient and distribute the energy to different locations within the system 100. For example, the system 100 includes a computing device 104 to control the overall operation of the system 100. The computing device 104 may be connected to the metering device 103 and/or power source 101 to monitor the availability, reliability, and/or price of the electrical energy. For example, based on comparison of the availability, reliability, and/or price of the electrical energy to one or more baseline or threshold levels, the computing device 104 determines to convert the electrical energy for storage as potential mechanical energy. In some embodiments, the computing device 104 may be a service operated by a third party such as a person or a company. The computing device 104 may be housed and operated at a location different than the location at which the rest of system 100 is located. That is to say, the computing device 104 is not bound to a specific location.

The metering device 103 may supply electrical power to an electrical load 120. The electrical load 120 is discussed in greater detail below. The metering device 103 may supply electrical energy to an electrical-to-mechanical energy conversion device 105. The metering device 103 may also be connected to an electricity grid to which the metering device 103 can provide electrical energy created by the power source 101 or receive electrical energy to supply to the electrical load 120 or the electrical-to-mechanical energy conversion device 105.

The electrical-to-mechanical energy conversion device 105 may receive electrical energy from the metering device 103 and convert the electrical energy to mechanical energy. For example, the electrical-to-mechanical energy conversion device 105 may comprise a gas-to-liquid conversion system. The gas-to-liquid conversion system may be configured to use electrical energy to convert a gas to a liquid. The gas-to-liquid conversion system may incorporate any known gas liquefaction system. For example, the gas-to-liquid conversion system may operate a Linde-Hampson cycle to convert gas to a liquid. The gas-to-liquid conversion system may repeatedly perform a cycle of compressing, cooling, and expanding a gas to reduce the temperature of the gas and convert the gas to a liquid. Accordingly, the gas-to-liquid conversion system may include compressors, coolers, heat exchangers, separators, expanders, and other equipment necessary for converting the gas to a liquid. The gas-to-liquid conversion system may be used to convert any of a number of gases to liquid. In various embodiments, the gas-to-liquid conversion system is used to convert ambient air of the system 100 to liquified air.

In other embodiments, the electrical-to-mechanical energy conversion device 105 may comprise an air compressor configured to use electrical energy to compress air so that it has a pressure greater than atmospheric pressure.

The electrical-to-mechanical energy conversion device 105 is not limited to a gas-to-liquid conversion system or an air compressor. Other embodiments of the electrical-to-mechanical energy conversion device 105 could be used without departing from the scope of this disclosure.

For example, the energy produced or stored at the electrical-to-mechanical energy conversion device 105 can be delivered upstream through the metering device 103 to the utility power grid or other energy distribution infrastructure as an independent energy source that can be bought and sold in the energy market. In certain scenarios, it may be advantageous for the system 100 to sell energy back to the utility power grid based on the price of energy from the grid. For example, when energy prices from the utility power grid are high, it may be advantageous to sell and or provide the energy produced or stored at the electrical-to-mechanical energy conversion device 105 to the grid.

As a particular example, monitoring of the closing costs of real time power can be performed regularly (e.g., every five minutes or at any other suitable interval). Such monitoring can be performed automatically by the computing device 104 or with assistance from one or more system operators, engineers, or analysts. Sudden or significant increases in the power costs can indicate that additional power may be needed at the utility power grid. In such a case, energy from the electrical-to-mechanical energy conversion device 105 can be sold and delivered upstream through the metering device 103 to the grid. In some embodiments, the metering device 103 can function as a two-way metering device and the system 100, as a whole, operates as a mechanical and/or thermal battery for the utility power grid.

In some embodiments, the air liquefaction process can include an air separation process that separates air into at least oxygen and carbon dioxide ($CO_2$) components. The oxygen produced in the air separation process can be used as an oxidizer in a chemical element (e.g., iron (Fe)) bed to generate thermal energy that can be used for heating in the system 100. Carbon sequesters in the oxidation process can create an exothermic chemical reaction in the rapidly oxidizing chemical element bed. In some embodiments, the thermal energy from the oxidation can be used in lieu of natural gas or other carbon dependent heating sources.

In some embodiments, the air separation process can include multiple phases. In one phase, the air is filtered, compressed, and passed through a molecular sieve, which removes water vapor and separates out the $CO_2$. In another phase, the $CO_2$ is captured, and the compressed air is passed into the compression system. The process may be nearly energy neutral to capture the $CO_2$ and operate the compression system. The waste stream of the $CO_2$ capture removes the energy required for the compression system to reach the second stage of compression. This, in turn, can reduce the total cost of operation of the system 100, or reduce the cost of carbon capture, or both.

In some embodiments, the air compression process can include multiple phases. In one phase, the air is filtered, compressed, and passed through a molecular sieve, which removes water vapor and separates out the $CO_2$. In another phase, the $CO_2$ is captured, and the compressed air is passed into the compression system. The process may be nearly energy neutral to capture the $CO_2$ and operate the compression system. The waste stream of the $CO_2$ capture removes the energy required for the compression system to reach the second stage of compression. This, in turn, can reduce the total cost of operation of the system 100, or reduce the cost of carbon capture, or both.

The system 100 further includes a thermal battery 107 (or energy storage device). The thermal battery 107 may store energy created by the electrical-to-mechanical energy conversion device 105. For example, when the electrical-to-mechanical energy conversion device 105 comprises a gas-to-liquid conversion system, the thermal battery 107 may be an insulated container capable of containing the liquid gas generated by the gas-to-liquid conversion system. The container may be any container suitable for containing the liquified gas. The thermal battery 107 may be a storage tank insulated and refrigerated to maintain a desired temperature of the liquid gas generated by the gas-to-liquid conversion system. In embodiments where the electrical-to-mechanical energy conversion device 105 is an air compressor, the thermal battery 107 may be a storage tank configured to contain pressurized air. In some embodiments, the thermal battery 107 can be a storage tank configured to contain both liquified air and compressed air. In some embodiments, the thermal battery 107 can include one or more liquid or solid materials (e.g., liquid $CO_2$, dry ice, zeolite crystals, and the like) capable of thermochemically storing thermal energy (heat or cold storage) from (or for use by) the electrical-to-mechanical energy conversion device 105. Other embodiments of the thermal battery 107 could be used without departing from the scope of this disclosure.

The system 100 may include a heater or heat exchanger 108 (hereinafter referred to simply as "heater"). The heater 108 may heat the air delivered to the heater 108 from the thermal battery 107. For example, in embodiments where the thermal battery 107 stores liquified air, the heater 108 may heat the liquified air from the thermal battery 107 to gasify the liquified air back to a gaseous state. The heater 108 is configured to make the system 100 more efficient by improving the gasification of the liquified air from the thermal battery 107 prior to the air entering a power supply system 109. In various embodiments, a heater 108 may not be required for the gasification of the liquified air stored in the thermal battery 107. In these embodiments, atmospheric heat acting on the liquified air as the liquified air travel from the thermal battery 107 to the power supply system 109 may be enough to convert the liquified air to a gaseous state. For example, liquified air may be stored in the thermal battery 107 below the temperature at which liquified air converts to its gaseous state (e.g., approximately −320 degrees Fahrenheit at or near atmospheric pressure). The heat from surround ambient air can convert liquified air to its gaseous state. In this example, the heater 108 is configured to accelerate the conversion of liquified gas from a liquid to a gas. Accordingly, one having skill in the art will understand that the heater 108 is not required for the system 100 but is configured to make the operation of system 100 more efficient.

The heater 108 may heat the air using any of a number of different sources. The heater 108 may generate heat specifically to heat the air. In some embodiments, the heater 108 may be a gas-fired heater or an electric heater configured to heat the air from the thermal battery 107. In other embodiments, the heater 108 may be supplied heat from a heat source 122 of the system 100. The heat source 122 of the system 100 is discussed in further detail below. When the heater 108 uses heat generated by the heat source 122, the heater takes advantage of energy that would otherwise by wasted. As discussed in further detail below, the heat source 122 may be the servers, computer systems and other electronic devices of a data center that output heat during operation. The heat output by such a heat source would typically be lost during operation of the data center. The heater 108 may use the heat generated by the heat source 122 to heat the liquified air to convert the liquified air to a gaseous state or heat compressed air during decompression. Thus, the heater 108 is configured to make the system 100 more efficient by effectively using energy of the system (e.g., heat generated by the power supply system 109) that would otherwise be lost.

In embodiments where the thermal battery 107 stores liquified air, the gasification of the liquified air results in an increase in pressure of the gaseous air due to the liquid expanding to a gaseous state. The air released from the thermal battery 107 is released as liquified air at approximately atmospheric pressure. The liquified air is then heated to be converted to a gaseous state either solely with atmospheric heat or with the heater 108. During this heating process, the liquified air turns to a gaseous state and becomes pressurized above atmospheric pressure. The pressurized, or compressed, gaseous air is then supplied to the power supply system 109.

The power supply system 109 can receive mechanical energy from the thermal battery 107 and converts the mechanical energy to electrical energy. In various embodiments, the power supply system 109 provides uninterruptible or nearly-uninterruptible power supply to the electrical load 120. As used herein, uninterruptible or nearly-uninterruptible and derivatives thereof refer to a power supply that provides a constant power level within a time period on the order of milliseconds from when a backup power supply is needed and/or activated. In various embodiments, the power supply system 109 provides consistent power to the load 120 and includes mechanical energy storage mechanisms, such as a flywheel or chemical battery in combination or individually, as a backup instance of near-instantaneous power to provide uninterruptible or nearly-uninterruptible power supply or power generation, for example, in the event of power loss. In some embodiments, during periods of time where the electrical energy is not readily available and/or cost efficient, or when there is a failure of a primary energy source, the computing device 104 may determine to discharge and convert the stored mechanical energy in the thermal battery 107 to electrical energy to power (and in some embodiments, cool) the electrical load 120. For example, the computing device 104 may, based on comparison of the availability, reliability, and/or price of the electrical energy to one or more baseline or threshold levels, determine to convert the stored potential mechanical energy into electrical energy to power the load 120. For example, the computing device 104 may be connected to and cause the power supply system 109 to discharge and convert the mechanical energy to electrical energy to supply the load 120.

In various embodiments, the power supply system 109 includes a compressed air-powered power generation unit configured to use the compressed air to create electrical energy. In various embodiments, the power supply system 109 includes a turboexpander or an expander turbine coupled to a generator to convert the mechanical energy of the compressed air to electrical energy. The power supply system 109 is not limited to the stated embodiments. Other embodiments of the power supply system 109 (including gas fired or carbon-based fuels) could be used without departing from the scope of this disclosure.

The electrical load 120 may be supplied with electrical energy from the power supply system 109. As previously discussed, the electrical load 120 may also be supplied with electrical energy that is created directly by the power source 101 from the metering device 103 or from a utility power grid. The electrical load 120 may be any component that consumes electrical energy. The electrical load 120 may be a building that houses electronic devices, such as a data center. Other embodiments of the electrical load 120 could be used without departing from the scope of this disclosure.

The heat source 122 may be a power-dense environment which outputs heat. The power-dense environment may be part of the electrical load 120. For example, when the electrical load 120 is a data center, as described above, the heat source 122 may be the servers, computer systems and other electronic devices of the data center that output heat during operation and may need to be cooled to ensure proper operation. Other embodiments of the heat source 122 could be used without departing from the scope of this disclosure.

The heat source 122 may be cooled by an exhaust of the power supply system 109. For example, when the power supply system 109 is a compressed air-powered turbine, as described above, the turbine converts compressed air from the thermal battery 107 to electrical energy. In the process of converting the compressed air to electrical energy, the turbine exhausts cold air. The cold air exhausted by the turbine may be supplied to the heat source 122 to cool the heat source 122. The cooling can be performed directly or indirectly. An example of direct cooling is simply injecting the air from the exhaust of the turbine to the data center through one or more air ducts. An example of indirect cooling is cooling a fluid through a coil that is pumped to a cooling system of the data center, which cools the data center through the use of existing fans via cooling from the fluid circulated from the turbine exhaust air to liquid heat exchange. In some embodiments, the fluid is a non-freezing fluid at temperatures of, e.g., −220° F. to −6° F. Thermal energy from the data center hot aisle air can be transferred to the non-freezing fluid. Thus, the fluid can be used as a thermal conduit. Additional details of heat transfer systems for cooling the heat source 122 are described in greater detail below.

Figure 1B:
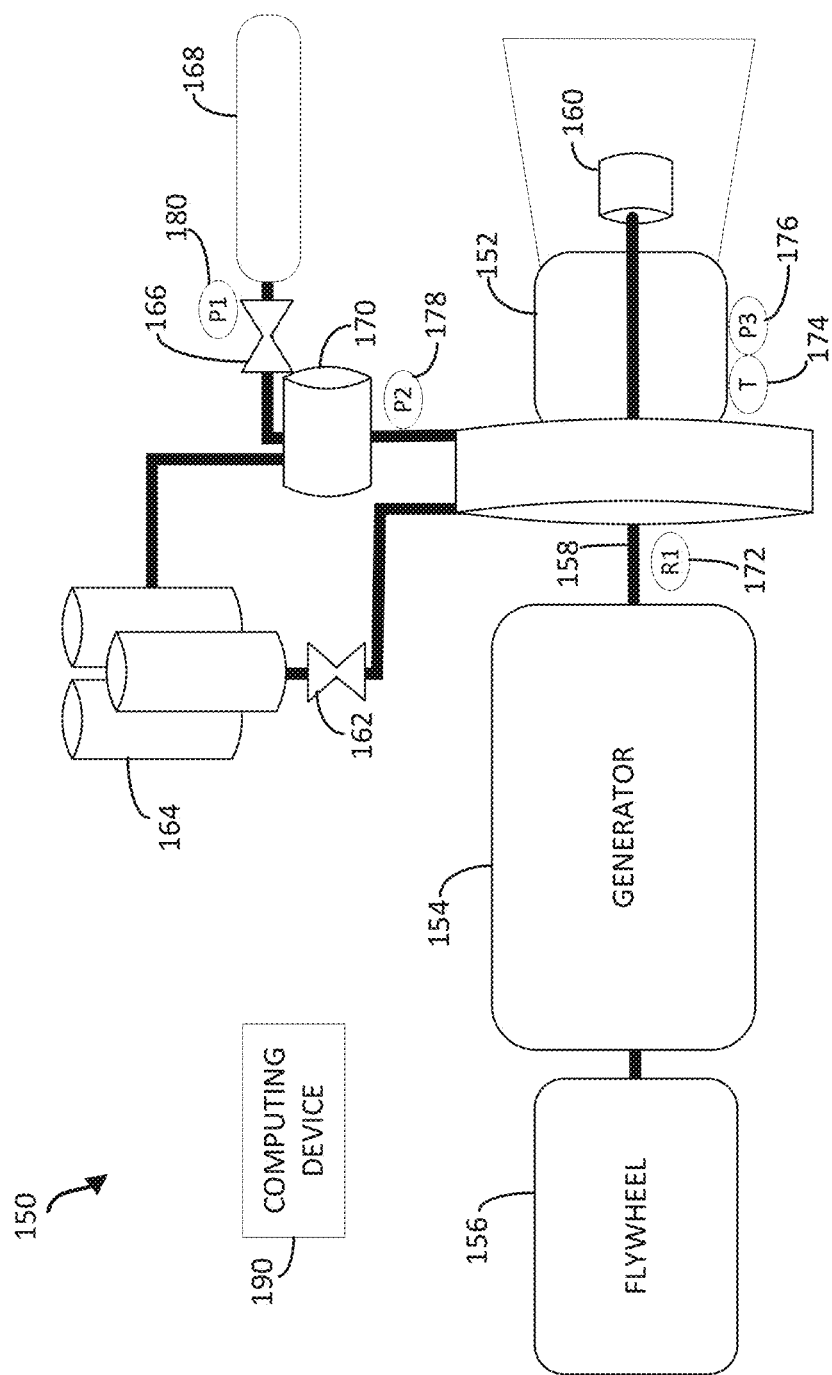
FIG. 1B illustrates an example of a power supply system for use in a power supply and cooling system according to various embodiments of the present disclosure.

FIG. 1B illustrates an example of a power supply system 150 for use in a power supply and cooling system according to various embodiments of the present disclosure. The power supply system 150 is one example implementation of the power supply system 109 of FIG. 1A. The embodiment of the power supply system 150 shown in FIG. 1B is for illustration only. Other embodiments of the power supply system 150 could be used without departing from the scope of this disclosure.

As illustrated in FIG. 1B, the power supply system 150 includes a turbine 152, a generator or alternator 154 (herein referred to as simply "generator"), and a flywheel 156 to supply power to a data center. As discussed in greater detail below, compressed air from a storage tank 168 or liquid air from a storage tank 164 may be supplied to the turbine 152 through a supply line. The turbine 152 is powered by the compressed air or liquid air to spin a shaft 158 coupled with the generator 154. The generator 154 is configured to convert the mechanical energy created by the turbine 152 into electrical energy. Specifically, the rotor of the generator 154 may be coupled to the shaft 158 of the turbine 152 to generate electrical energy. The mechanical energy supplied to the turbine 152 can be stored in the momentum of the spinning flywheel 156.

In various embodiments, the rotating elements of the turbine 152, generator 154, and flywheel 156 may be rotationally supported by magnetic bearings or other low friction bearings. The magnetic bearings increase the efficiency of the components and also reduce the required maintenance to the components when compared to traditional bearings. For example, regardless of whether the power supply system 150 is being used as a power source for the data center, the turbine 152 and the flywheel 156 (and, in some embodiments, also the generator 154) may continue to rotate so as to provide instantaneous or near-instantaneous back up power in the event of failure of or switch over from the primary power source (e.g., power source 101). The use of magnetic bearings in these embodiments can allow for this consistent rotation to be feasible with reduced maintenance costs.

In some embodiments, small amounts of electrical energy or small amounts of compressed or liquid air can keep the turbine 152, the generator 154, and the flywheel 156 spinning. This is referred to herein as spinning reserve. As will be discussed in greater detail below, if the turbine 152 ever ceases to provide mechanical energy to the generator 154 or if an alternate power source, such as power source 101 fails or is desired to be turned off, the mechanical energy stored in the momentum of the spinning flywheel 156 can be used to power the generator 154 so that the generator 154 can continue to generate electrical energy even when the turbine 152 is not in operation or is operating at reduced speed, for example, during start up or switch over. That is, the flywheel 156 keeps the shaft 158 spinning long enough to restart the turbine 152 so that the turbine 152 once again provides the power to rotate the shaft 158. Additionally or alternatively, in some embodiments, the system 150 includes a spinning reserve motor 160 that can rotate the shaft 158 during non-production periods to provide a spinning soft start via a minimum spinning rate as discussed in greater detail below.

The spinning reserve can be maintained by high pressure air or gas, by the spinning reserve motor 160, or by a combination of these. The spinning reserve motor 160 is a belted or geared electric motor coupled to the shaft 158 downstream of the blades of the turbine 152. When in operation, the spinning reserve motor 160 ensures that the turbine 152 rotates at a minimum rate (e.g., 1000 RPM) twenty-four hours/day. Additionally or alternatively, the system 150 includes a high pressure storage tank 170 for the spinning reserve. The storage tank 170 stores dry compressed air, compressed nitrogen gas, liquid air, or a combination of these at high pressure (e.g., 3000 psi). To maintain the spinning reserve, the storage tank 170 constantly bleeds air, which is delivered to the turbine 152 to spin the turbine 152 at the minimum rate (e.g., 1000 RPM) twenty-four hours/day. Of course, at full speed, the turbine 152 spins around 10,000 RPM-30,000 RPM. In some embodiments, the storage tank 170 is a high-volume compressed air or compressed gas segregated storage tank with an isolated delivery path to the turbine 152 and storage capable of starting and operating the turbine 152 and the generator 154 for a prescribed period of time required for the upstream storage tank 164, liquid air flow valve 162 or upstream storage tank 168 compressed air control valve 166 or combination of the valves, and delivery system to bring the specified fuel to the turbine inlet.

The system 150 also includes multiple sensors, including a speed sensor 172 for measuring the rotational speed (in RPMs) of the shaft 158, a temperature sensor 174 for measuring a temperature of the lubricant in the turbine 152, a pressure sensor 176 for measuring pressure in the lubrication system of the turbine 152, a pressure sensor 178 for measuring the pressure of air or gas entering a turboexpander of the turbine 152, and a pressure sensor 180 for measuring the pressure of the air in the storage tank 168.

In some embodiments, the system 150 includes at least one computing device 190 provided to control operations of one or more components of the system 150. For example, the computing device 190 can perform any of the operations described below. In some embodiments, the computing device 190 may be a service operated by a third party such as a person or a company. The computing device 190 may be housed and operated at a location different than the location at which the rest of system 150 is located. That is to say, the computing device 190 is not bound to a specific location or configuration. While only one computing device 190 is shown in FIG. 1B, the system 150 could actually include multiple computing devices 190, each providing control to a different part of the system 150.

In one aspect of operation, the sensors 172-180 and the computing device 190 communicate and operate together to ensure that the spinning reserve is maintained and the turbine 152 can accept the critical load within the prescribed time. In some embodiments, the sensors 172-180 and the computing device 190 are programmed to monitor and adjust the liquid air flow valve 162 or monitor and adjust the spinning reserve motor 160 through Variable Frequency Drive (VFD) inputs from a sensor array, to maintain the prescribed RPM of the shaft 158. Herein, the prescribed RPM is when the lubricant of the turbine 152 is at the operating temperature, the generator 154 is spinning at a prescribed rate, and the flywheel 156 is spinning at a prescribed rate.

In some embodiments, the critical hierarchy is the lubricant temperature and lubricant system pressure (as measured by the sensors 174, 176). One or more preprogrammed algorithms executed by the computing device 190 correlate the rotation speed of the shaft 158 (in RPMs) to air flow through the liquid air flow valve 162 (in lb. air/sec.) and can use the lubricant temperature and lubricant system pressure as a proxy to ensure the rest of the system 150 is working. Additionally or alternatively, one or more executed by the computing device 190 correlate the rotation speed of the shaft 158 (in RPMs) to the rotation speed of the spinning reserve motor 160 (in RPMs) and can use the lubricant temperature and lubricant system pressure as a proxy to ensure the rest of the system 150 is working.

In one aspect of operation, when an incoming power failure upstream is detected upstream (e.g., by one or more electrical power sensing meters or other equipment), the computing device 190 provides a signal to the generator 154 to operate at full speed and capacity. This will start a programmed sequence of events.

First, the spinning reserve motor 160 is disengaged and/or the storage tank 170 is closed such that the small stream of air is no longer delivered to the turbine 152. This is performed before the speed of the turbine 152 is increased. The flywheel 156 accepts the critical electrical load. Next, the compressed air valve 166 (which can be an air dump valve) is opened fully to boost the turbine 152 and the generator 154 line up to full speed. Once the turbine 152 and generator 154 are at the correct speed and frequency, the critical electrical load is transferred to the generator 154.

Figure 2A:
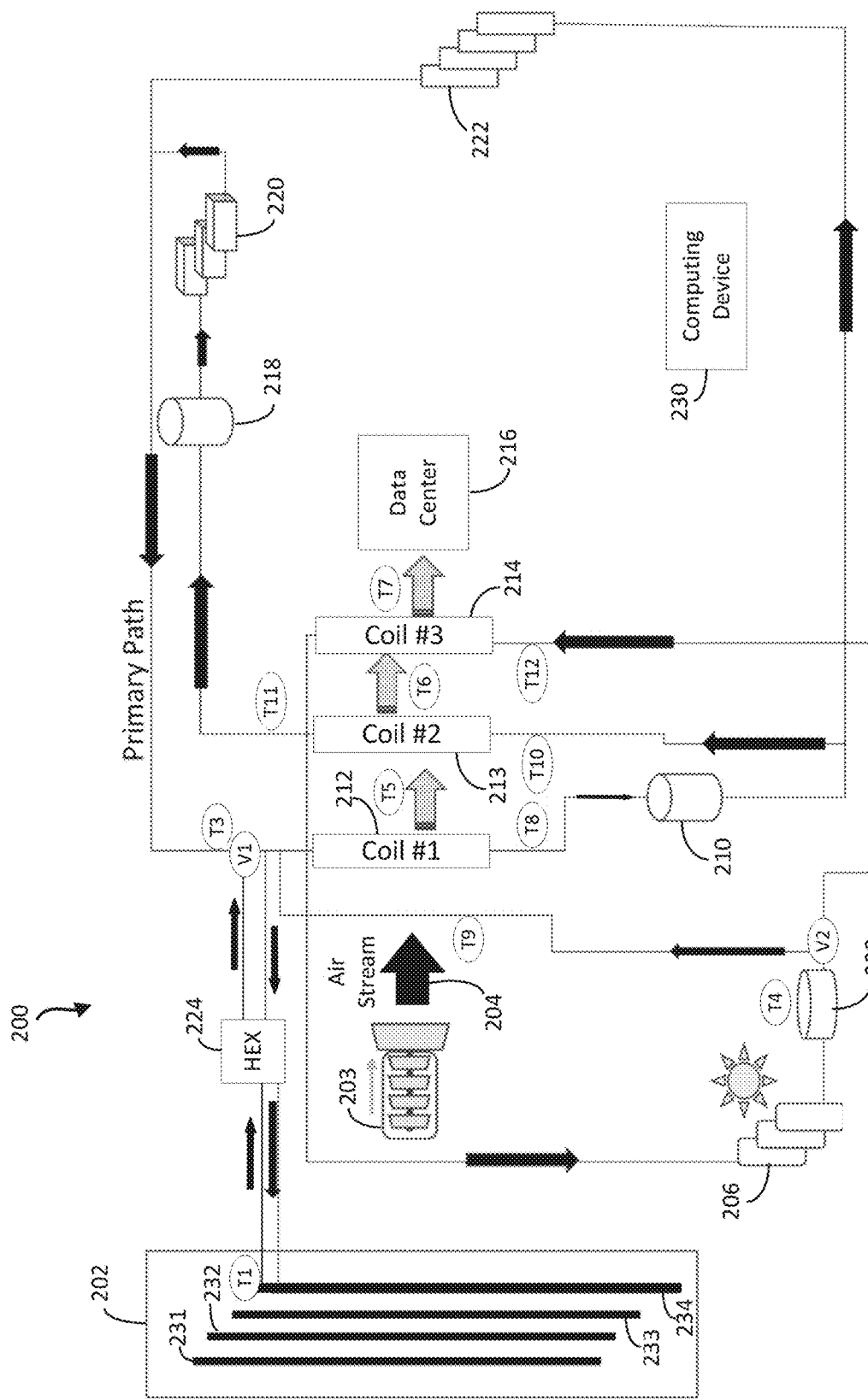
FIG. 2A illustrates an example of a heat transfer system for use in a power supply and cooling system according to various embodiments of the present disclosure.

FIG. 2A illustrates an example of a heat transfer system 200 for use in a power supply and cooling system according to various embodiments of the present disclosure. For ease of explanation, the heat transfer system 200 is described as being used in conjunction with the power supply and cooling system 100 of FIG. 1A. Of course, this is merely one example. The heat transfer system 200 could be used with any other suitable system. Also, the embodiment of the heat transfer system 200 shown in FIG. 2A is for illustration only. Other embodiments of the heat transfer system 200 could be used without departing from the scope of this disclosure.

As illustrated in FIG. 2A, the heat transfer system 200 includes a stream 204 of cold air exhaust from a turbine 203 of a power generating system, such as the power supply system 109 of FIG. 1A. For example, when the power supply system 109 is part of a compressed air energy system, the air stream 204 can have a temperature of approximately +320° F. to −150° F., although higher or lower temperatures are within the scope of this disclosure. Multiple coils, including coils 212-214, are disposed in series in the air stream 204. The coils 212-214 can be disposed in a large air duct through which the air stream 204 passes. In some embodiments, the duct is 8-10 feet across, although larger or smaller duct sizes are within the scope of this disclosure. Each of the coils 212-214 has fluid passing therethrough at a higher temperature than the air stream 204. Thus, the coils 212-214 act as heat exchangers in which thermal energy from the fluid(s) passing through the coils 212-214 add thermal energy to the air stream 204, thus warming the air stream 204 at each coil 212-214. The warmed air stream 204 can then be provided as cooling air to a data center 216. The data center 216 can represent (or be represented by) the electrical load 120 of FIG. 1A. This heat exchange process will now be described in greater detail.

The coil 212 is the first coil encountered by the air stream 204, and thus the coil 212 receives the air stream 204 at its coldest temperature, e.g., −150° F., which represents the entering air temperature (EAT) of the air stream 204. Passing through the coil 212 is a fluid that is output from a close coupled cooling (CCC) coil 222. In some embodiments, the fluid includes a glycol mixture or another suitable fluid. The CCC coil 222 represents a coiling coil inside the data center 216. In some embodiments, the temperature of the fluid entering the coil 212 (i.e., the entering fluid temperature (EFT)) is approximately 120° F. As the relatively warm fluid passes through the coil 212, thermal energy from the fluid is transferred (e.g., through conduction, convection, or a combination of these) to the air stream 204, which causes the air stream 204 to be warmer and the fluid to be cooler. In some embodiments, the temperature of the fluid leaving the coil 212 (i.e., the leaving fluid temperature (LFT)) is approximately 80° F. In some embodiments, the fluid is output to a fluid storage 210, which acts as a reservoir for the fluid. As discussed below, the fluid in the fluid storage 210 can be made available for delivery to (and through) the coil 213. Due to the warming of the air at the coil 212, the leaving air temperature (LAT) of the air stream 204 is significantly higher than the −150° F. EAT. For example, the LAT of the air stream 204 leaving the coil 212 can be approximately −50° F.

The coil 213 is the next coil encountered by the air stream 204. That is, after the air stream 204 passes over or through the coil 212, the air stream 204 reaches the coil 213. The EAT of the air stream 204 at the coil 213 is approximately the same as the LAT of the air stream 204 at the coil 212, e.g., approximately −50° F. Passing through the coil 213 is fluid that is output from the fluid storage 210. The EFT of the fluid at the coil 213 is approximately 80° F. As the relatively warm fluid passes through the coil 213, thermal energy from the fluid is transferred to the air stream 204, which causes the air stream 204 to be additionally warmer and the fluid to be cooler. In some embodiments, the LFT of the fluid leaving the coil 213 is approximately 40° F. to 60° F. Thus, the fluid leaving the coil 213 is considered to be chilled fluid, which can be used for cooling in the data center 216. In some embodiments, the chilled fluid is output to a chilled fluid storage 218 (e.g., a storage tank), which acts as a reservoir for the chilled fluid. Due to the warming of the air at the coil 213, the LAT of the air stream 204 is significantly higher than the −50° F. EAT. For example, the LAT of the air stream 204 leaving the coil 213 can be approximately 10° F.

The coil 214 is the next coil encountered by the air stream 204 after passing over or through the coil 213. The EAT of the air stream 204 at the coil 214 is approximately the same as the LAT of the air stream 204 at the coil 213, e.g., approximately 10° F. Passing through the coil 214 is a fluid that is output from a heated fluid reservoir 208. The EFT of the fluid at the coil 214 is significantly warmer than ambient temperatures (e.g., approximately 200° F.). As the relatively warm fluid passes through the coil 214, thermal energy from the fluid is transferred to the air stream 204, which causes the air stream 204 to be additionally warmer and the fluid to be cooler. In some embodiments, the LFT of the fluid leaving the coil 214 is approximately 130° F. In some embodiments, the fluid is output to one or more heaters 206, which act to reheat the fluid. Due to the warming of the air at the coil 214, the LAT of the air stream 204 is significantly higher than the 10° F. EAT. For example, the LAT of the air stream 204 leaving the coil 214 can be approximately 70° F. to 104° F., which is a suitable temperature range for delivery to the data center 216. Once input to the data center 216, the air stream 204 can provide direct cooling to the data center 216. For example, the air stream 204 can be circulated around one or more heat-generating components (e.g., servers) within the data center 216.

The fluid passing through the coil 214 is part of a heated fluid loop that includes the coil 214, the heated fluid reservoir 208, and the heaters 206. In some embodiments, the heaters 206 are solar fluid heaters that use thermal energy received from the sun to heat the fluid (e.g., to approximately 200° F.). Such solar fluid heaters can include one or more solar panels, heat exchangers, or the like. In some embodiments, operation of the heaters 206 can be enhanced with concentrating mirrors, reflective surfaces, or reflective wells to increase fluid temperatures. Of course, other methods for heating (other than solar) could be used in the heaters 206, such as a hydrogen fueled heater. The fluid is first stored in the heated fluid reservoir 208, and later delivered to the coil 214. The fluid is then cooled by the air stream 204 as the fluid passes through the coil 214. Once output from the coil 214, the fluid is then returned to the heaters 206. The heaters 206 can include any number and configuration of solar heaters that are suitable for heating the fluid. In some embodiments, fluid in the heated fluid reservoir 208 can be occasionally or regularly recirculated through the heaters 206 to increase or maintain fluid temperature.

In some embodiments, a portion of fluid from the heated fluid reservoir 208 can also be used to heat the fluid entering the coil 212 if that fluid entering the coil 212 is not already suitably heated. For example, if the fluid leaving the CCC coil 222 is only 110° F., but the desired EFT at the coil 212 is 120° F., then heated fluid from the heated fluid reservoir 208 can be used to warm the fluid from the CCC coil 222 to the desired 120° F. EFT before the fluid enters the coil 212.

The fluid passing through the coils 212, 213 is part of another fluid loop that includes the coils 212, 213, the fluid storage 210, the fluid storage 218, and one or more air handlers 220 associated with the data center 216. As discussed above, the fluid is cooled to approximately 80° F. LFT in the coil 212 and is temporarily stored in the fluid storage 210, since flow rates in different parts of the fluid loop may be inconsistent. A portion of the fluid is later input to the coil 213 and cooled to a 40° F.-60° F. chilled fluid. The chilled fluid is temporarily stored in the fluid storage 218, and can be output to the air handlers 220, which operate to provide direct air cooling to the data center 216 or provide liquid to air direct cooling. At the air handlers 220, the chilled fluid acts to cool the warm air passing through the air handlers 220. This in turn heats the chilled fluid to a hotter temperature (e.g., 100° F.-120° F.). The fluid then mixes with fluid from the CCC coil 222, and the combined fluid is delivered to the coil 212.

The fluid passing through the CCC coil 222 is part of an additional fluid loop that includes the coil 212, the fluid storage 210, and the CCC coil 222. As discussed above, the fluid is cooled to approximately 80° F. LFT in the coil 212 and is temporarily stored in the fluid storage 210. A portion of the fluid in the fluid storage 210 is later delivered to the CCC coil 222, where the fluid is used for cooling of the data center 216. Due to a heat transfer process at the CCC coil 222, the LFT of the fluid leaving the CCC coil 222 is hotter (e.g., 100° F.-120° F.). The heated fluid is then returned to the coil 212.

Figure 2B:
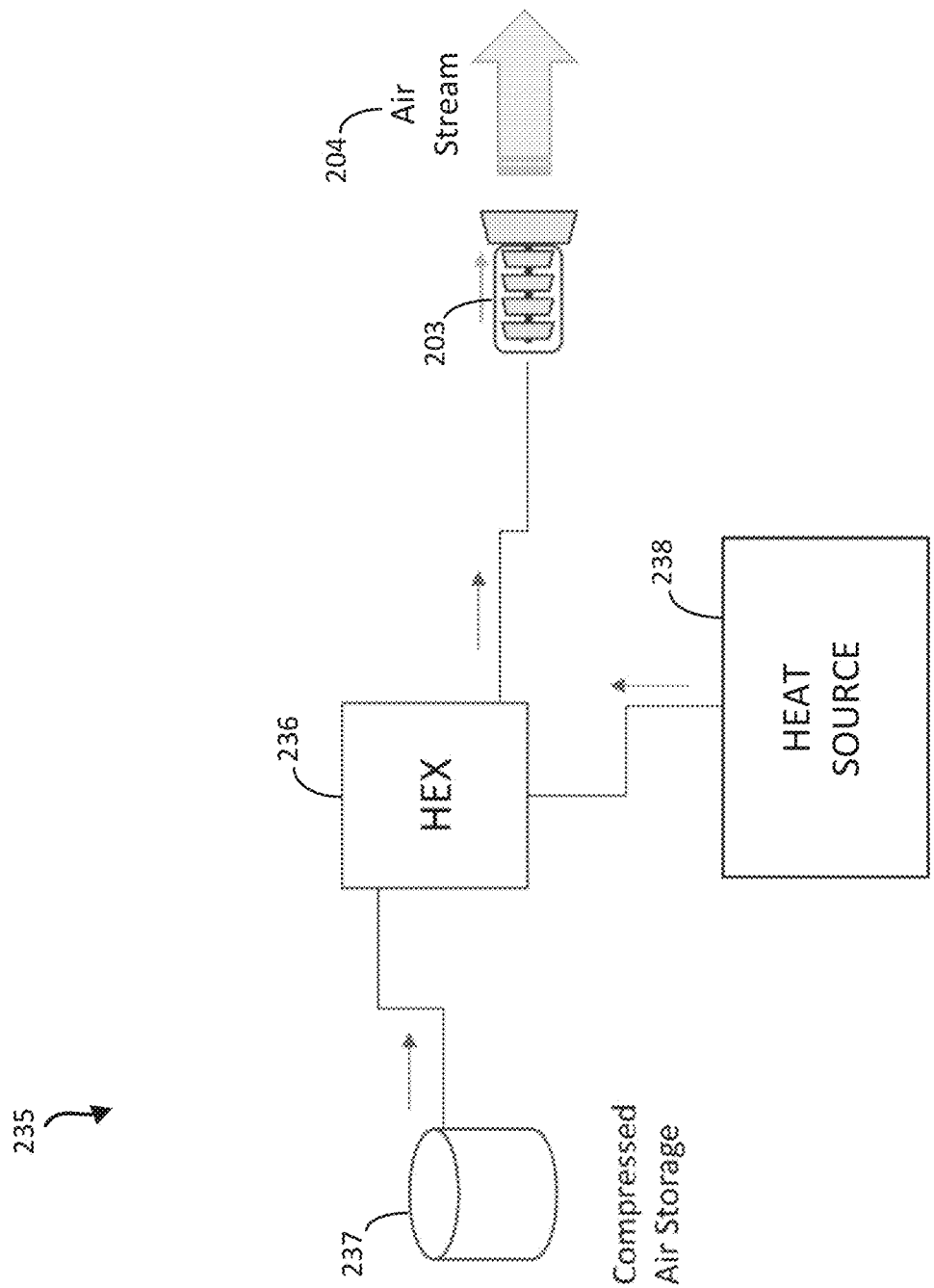
FIG. 2B illustrates portions of an example compressed air decompression heating cycle for use with the heat transfer system of FIG. 2A according to various embodiments of the present disclosure.

Any suitable method(s) or process(es) for heating air streams may be applied to the stored compressed air delivery path prior to entering the turbine 203. For example, FIG. 2B illustrates portions of an example compressed air decompression heating cycle 235 for use with the heat transfer system 200 according to various embodiments of the present disclosure. In some embodiments, the heating cycle 235 can be used to improve the efficiency of the mass flow rate of the turbine 203 in the heat transfer system 200.

As shown in FIG. 2B, the heating cycle 235 includes a heat exchanger 236 that receives compressed air from a compressed air storage 237 and thermal energy (heat) from a heat source 238. The compressed air storage 237 may represent (or be represented by) the mechanical battery 107 of FIGS. 1A and 1B (in the form of a storage tank configured to contain pressurized air or gas). The heat source 238 can include any suitable source of thermal energy, e.g., a hydrogen fueled heater, a solar heater, another combustible fuel heater, thermal transfer from an internal combustion engine exhaust and/or cooling system, or the like. In some embodiments, the heat source 238 can represent (or be represented by) the heater 108 of FIGS. 1A and 1B. The heat exchanger 236 uses the thermal energy from the heat source 238 to raise the temperature of the decompressing air from the compressed air storage 237 before providing the warmed air to the turbine 203. This can provide higher efficiency for operation of the turbine 203 with elevated air temperatures greater than 32° F.

In some embodiments, the heat transfer system 200 also includes a district heating and cooling system 202. The district heating and cooling system 202 includes utility-supplied hot and/or cold water that may be provided to facilities that use the water (e.g., a power generation facility), and conditioned water that is returned from the facilities. The district heating and cooling system 202 includes district domestic water 231, which, in some embodiments, may be at an ambient temperature (e.g., approximately 60° F.); district chilled water 232, which may be at approximately 40° F.-50° F.; district heat supply water 233, which may be at approximately 180° F., and district heat return water 234, which may be at approximately 90° F.-120° F. Of course, these temperatures are examples only; other embodiments could include hotter or colder temperatures.

In some embodiments, the district heating and cooling system 202 can be used as a heat sink or a heat source in the heat transfer system 200. For example, thermal energy in the fluid from the CCC coil 222 can be provided to the district heat return water 234 using a heat exchanger 224. As shown in FIG. 2A, one side of the heat exchanger 224 includes a fluid loop between the district heat return water 234 and the heat exchanger 224. The other side of the heat exchanger 224 includes a fluid loop between the heat exchanger 224 and the fluid line between the CCC coil 222 and the coil 212. Because the fluid from the CCC coil 222 is at a higher temperature than the temperature at the district heat return water 234 (e.g., approximately 120° F. versus approximately 90° F.-120° F.), the heat exchanger 224 can operate to transfer thermal energy from the fluid from the CCC coil 222 to the district heat return water 234.

In some embodiments, the input and output thermal values of the heat exchanger 224 are calculated from sensor data input into a computer algorithm. The heat exchanger 224 can be monitored using one or more sensors on the district heating and cooling system 202 and/or the heat exchanger 224 to provide precision delivery of thermal content to the district heating and cooling system 202 through automated computer control of one or more valves and actuators.

In some embodiments, the system 200 includes at least one computing device 230 provided to control operations of one or more components of the system 200. For example, the computing device 230 can determine EAT, EFT, and air flow and fluid flow rates at one or more of the coils 212-214, determine a desired LAT or LFT, calculate a change in one or more flow rates to achieve the desired LAT or LFT, and/or control one or more valves, three-way valves, actuators, dampers, manifolds, or the like to effect the change in the flow rate(s). In some embodiments, the computing device 230 may be a service operated by a third party such as a person or a company. The computing device 230 may be housed and operated at a location different than the location at which the rest of system 200 is located. That is to say, the computing device 230 is not bound to a specific location or configuration. While only one computing device 230 is shown in FIG. 2A, the system 200 could actually include multiple computing devices 230, each providing control to a different part of the system 200.

Figure 2C:
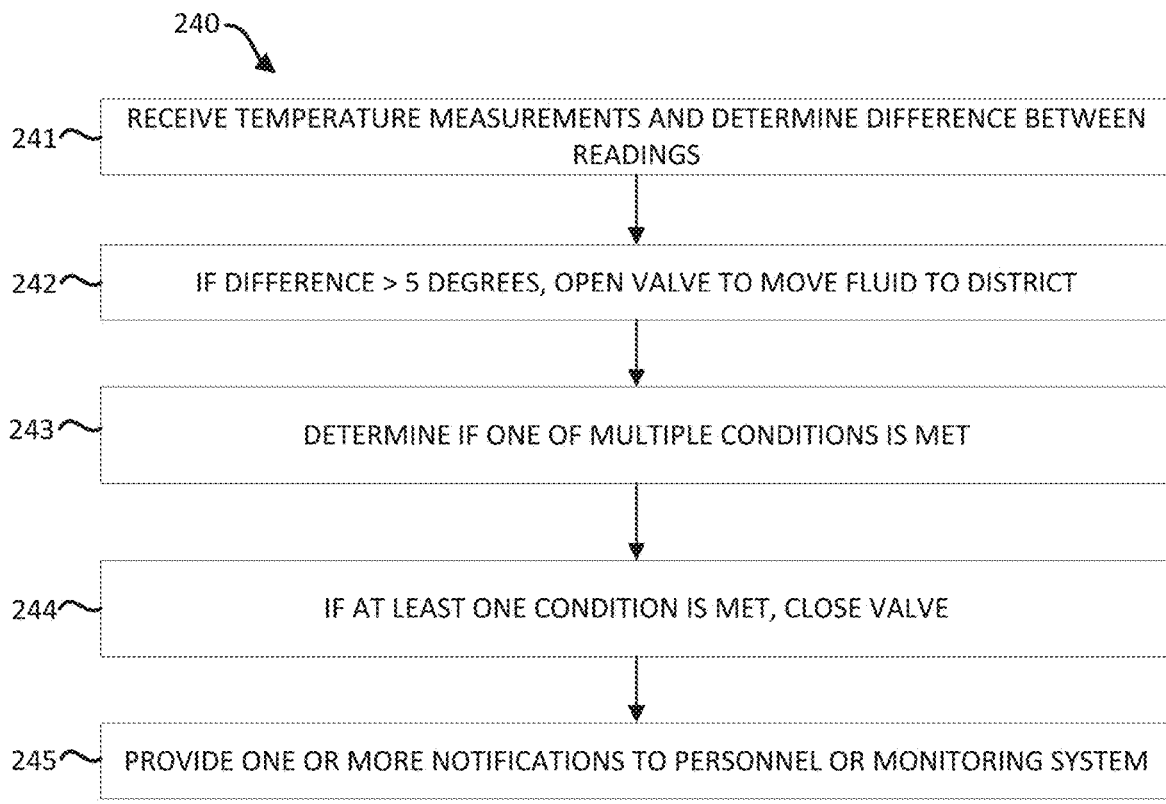
FIGS. 2C through 2F illustrate example methods for performing control operations in a power supply and cooling system according to various embodiments of the present disclosure.

FIG. 2C illustrates an example method 240 for performing control operations in a power supply and cooling system according to various embodiments of the present disclosure. For ease of explanation, the method 240 is described as being performed using the systems 100, 200 of FIGS. 1A and 2A. However, the method 240 may be used with any other suitable device or system. The embodiment shown in FIG. 2C is for illustration only. Other embodiments of the method 240 could be used without departing from the scope of this disclosure.

At operation 241, the computing device 230 receives a temperature reading from the sensors T1 and T3 and determines whether the fluid temperature at the sensor T3 (i.e., the fluid temperature before entering the coil 212) is at least 5° F. greater than the district heat return water 234 temperature at the sensor T1.

At operation 242, if the T3 temperature is at least 5° F. greater than the T1 temperature, then the computing device 230 controls the valve V1 (which can include a three-way valve) to open, thereby allowing thermal transfer through the heat exchanger 224. This moves fluid to the district heat return water 234. The fluid is diverted to the heat exchanger 224 in a closed loop configuration between the return of the primary fluid path (which includes the outputs from the air handlers 220, the CCC coil 222, or both) and the heat exchanger 224. In some embodiments, the computing device 230 receives a signal from one or more upstream systems that the prime mover is in operation.

At operation 243, the computing device 230 determines if any of the following conditions are met: (1) the upstream prime mover is not operating, (2) the difference in temperature readings between the sensors T1 and T3 is less than 5° F., or (3) a user-defined condition is not met.

At operation 244, if one of the conditions is met from operation 243, then the computing device 230 controls the valve V1 to close, thereby closing fluid flow to the heat exchanger 224.

At operation 245, the computing device 230 provides one or more notifications to interested personnel or monitoring systems.

Figure 2D:
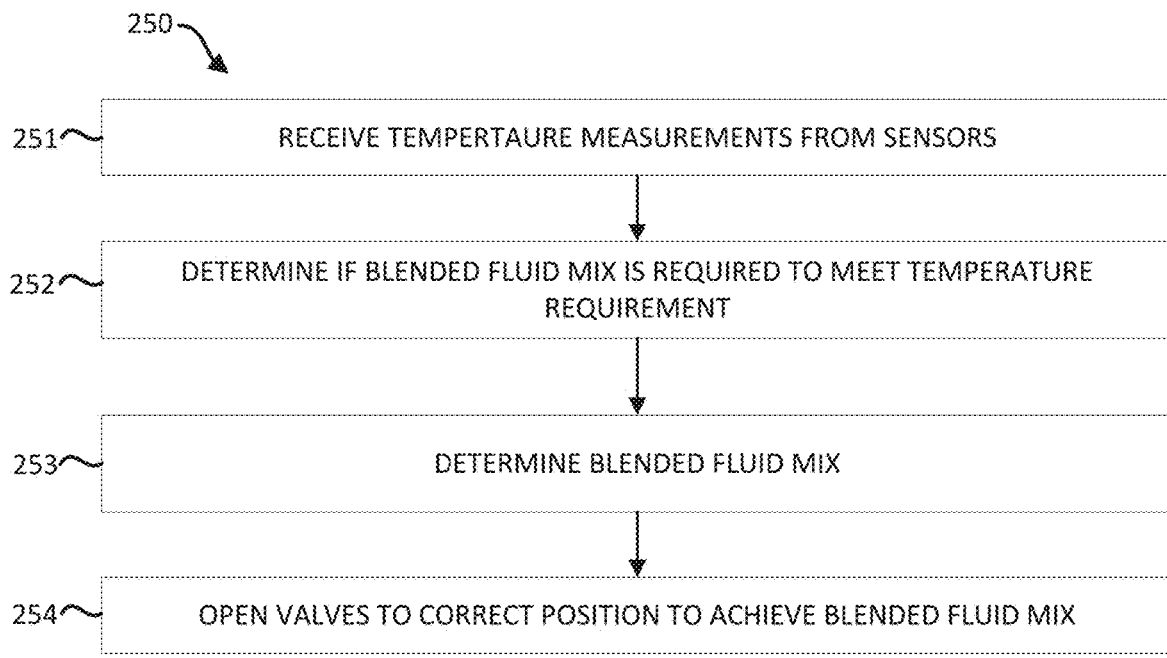

FIG. 2D illustrates an example method 250 for performing control operations in a power supply and cooling system according to various embodiments of the present disclosure. For ease of explanation, the method 250 is described as being performed using the systems 100, 200 of FIGS. 1A and 2A. However, the method 250 may be used with any other suitable device or system. The embodiment shown in FIG. 2D is for illustration only. Other embodiments of the method 250 could be used without departing from the scope of this disclosure.

At operation 251, the computing device 230 receives temperature measurements from the temperature sensors T3, T4, T5, T8, and T9.

At operation 252, the computing device 230 performs calculations using the temperature measurements to determine if a blended fluid mix from the primary fluid path and the heated fluid reservoir 208 is required to meet a LFT of 80° F. at the coil 212.

At operation 253, the computing device 230 determines an appropriate blended fluid mix. In some embodiments, the fluid mix can be fluid from the primary fluid path only (i.e., 100% primary fluid path). In some embodiments, the fluid mix can be fluid from the heated fluid reservoir 208 only (i.e., 100% heated fluid storage). In some embodiments, the fluid mix can be xx % fluid from the primary fluid path and yy % fluid from the heated fluid reservoir 208, where xx and yy are numbers between zero and one hundred and can be determined in real time.

At operation 254, the computing device 230 controls the control valves V1 and V2 (which can be three-way valves) to open to a correct position such that the fluid mix determined in operation 253 is achieved.

In some embodiments, operations 251-254 can be repeated to adjust the determined fluid mix.

Figure 2E:
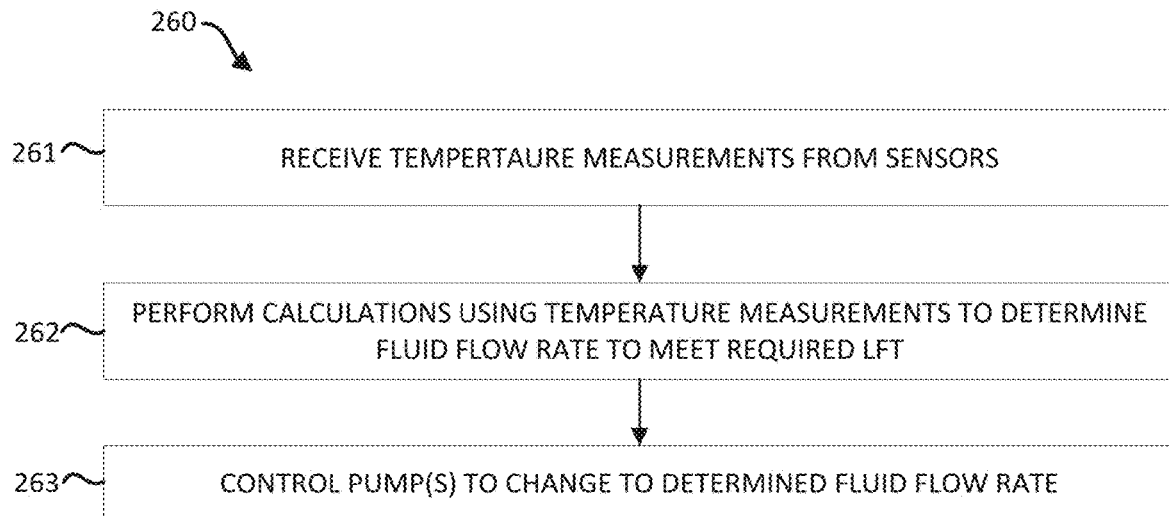

FIG. 2E illustrates an example method 260 for performing control operations in a power supply and cooling system according to various embodiments of the present disclosure. For ease of explanation, the method 260 is described as being performed using the systems 100, 200 of FIGS. 1A and 2A. However, the method 260 may be used with any other suitable device or system. The embodiment shown in FIG. 2E is for illustration only. Other embodiments of the method 260 could be used without departing from the scope of this disclosure.

At operation 261, the computing device 230 receives temperature measurements from the temperature sensors T5, T6, T10, and T11.

At operation 262, the computing device 230 performs calculations using the temperature measurements to determine an updated fluid flow rate through the coil 213 in order to meet a LFT between 40° F. and 60° F. at the coil 213.

At operation 263, the computing device 230 controls one or more pumps or valve positions associated with the coil 213 to change the current fluid flow rate to the determined updated fluid flow rate in operation 262.

In some embodiments, operations 261-263 can be repeated to adjust the determined fluid flow rate.

Figure 2F:
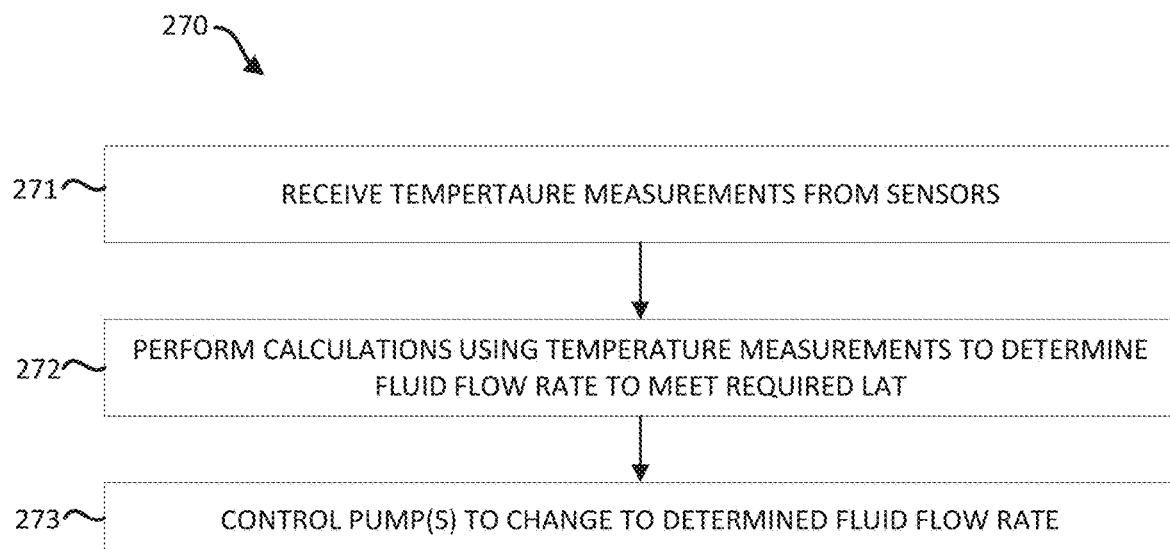

FIG. 2F illustrates an example method 270 for performing control operations in a power supply and cooling system according to various embodiments of the present disclosure. For ease of explanation, the method 270 is described as being performed using the systems 100, 200 of FIGS. 1A and 2A. However, the method 270 may be used with any other suitable device or system. The embodiment shown in FIG. 2F is for illustration only. Other embodiments of the method 270 could be used without departing from the scope of this disclosure.

At operation 271, the computing device 230 receives temperature measurements from the temperature sensors T6, T7, and T12. In some embodiments, the temperature sensor T7 is the control input for the data center 216.

At operation 272, the computing device 230 performs calculations using the temperature measurements to determine a fluid flow rate from the heated fluid reservoir 208 through the coil 214 to meet a LAT between 70° F. and 104° F. at the coil 214.

At operation 273, the computing device 230 controls one or more pumps or valve positions associated with the heated fluid reservoir 208 to change the fluid flow rate to the determined fluid flow rate in operation 272.

In some embodiments, operations 271-273 can be repeated to adjust the determined fluid flow rate.

The methods discussed above with regard to FIGS. 2C through 2F illustrate example operations that can be implemented in accordance with the principles of the present disclosure. Various changes could be made to the methods illustrated herein. For example, while shown as a series of steps, various steps in each figure could overlap, occur in parallel, occur in a different order, or occur multiple times. In another example, steps may be omitted or replaced by other steps. Also, it will be understood that multiple ones or all of the methods discussed above with regard to FIGS. 2C through 2F can be performed together in the system 200.

Figure 3A:
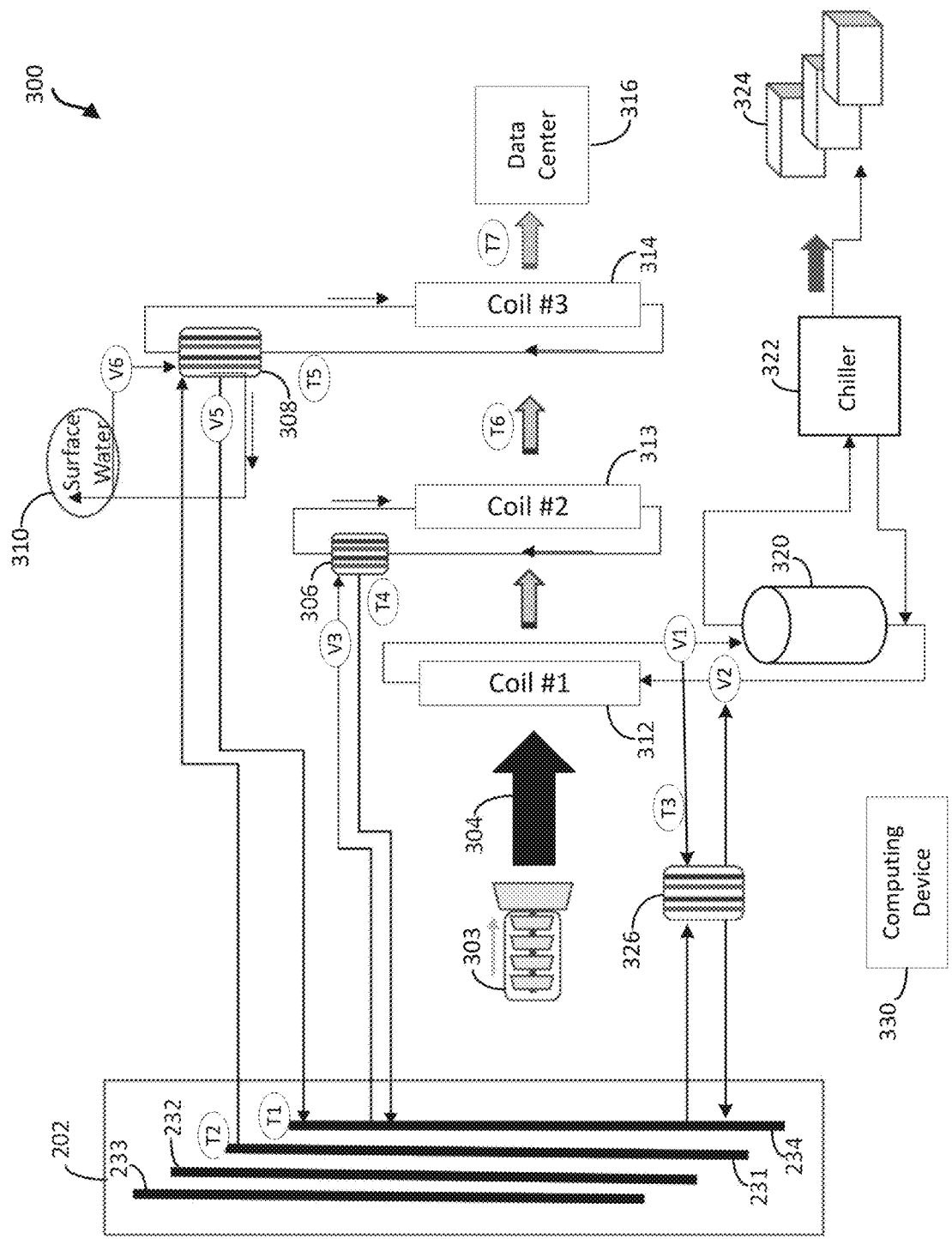
FIG. 3A illustrates another example of a heat transfer system for use in a power supply and cooling system according to various embodiments of the present disclosure.

FIG. 3A illustrates another example of a heat transfer system 300 for use in a power supply and cooling system according to various embodiments of the present disclosure. For ease of explanation, the heat transfer system 300 is described as being used in conjunction with the power supply and cooling system 100 of FIG. 1A. Of course, this is merely one example. The heat transfer system 300 could be used with any other suitable system. Also, the embodiment of the heat transfer system 300 shown in FIG. 3A is for illustration only. Other embodiments of the heat transfer system 300 could be used without departing from the scope of this disclosure.

As illustrated in FIG. 3A, the heat transfer system 300 includes a stream 304 of hot air exhaust from a turbine 303 of a power generating system, such as the power supply system 109 of FIG. 1A. For example, when the power supply system 109 is part of a liquid air energy system, the air stream can have a temperature of approximately 150° F., although higher or lower temperatures are within the scope of this disclosure. Multiple coils, including coils 312-314, are disposed in series in the air stream 304. The coils 312-314 can be disposed in a large air duct through which the air stream 304 passes. In some embodiments, the duct is 8-10 feet across, although larger or smaller duct sizes are within the scope of this disclosure. Each of the coils 312-314 has fluid passing through the coil at a lower temperature than the air stream 304. Thus, the coils 312-314 act as heat exchangers in which thermal energy from the air stream 304 adds thermal energy to the fluid(s) passing through the coils 312-314, thus cooling the air stream 304 at each coil 312-314. The cooled air stream 304 can then be provided as cooling air to a data center 316. The data center 316 can represent (or be represented by) the electrical load 120 of FIG. 1A. This heat exchange process will now be described in greater detail.

The coil 312 is the first coil encountered by the air stream 304, and thus the coil 312 receives the air stream 304 at its warmest temperature, e.g., 150° F. to 320° F., which represents the EAT of the air stream 304. Passing through the coil 312 is a fluid that is received from a fluid storage 320 and/or a chiller 322. In some embodiments, the EFT of the fluid entering the coil 312 is approximately 120° F. As the relatively cooler fluid passes through the coil 312, thermal energy from the warmer air stream 304 is transferred (e.g., through conduction, convection, or a combination of these) to the fluid, which causes the air stream 304 to be cooler and the fluid to be warmer. In some embodiments, the LFT of the fluid leaving the coil 312 is approximately 140° F. to 300° F. In some embodiments, the fluid is output back to the fluid storage 320, which acts as a reservoir for the fluid. Since fluid in a reservoir may be warmer near the top of the reservoir than near the bottom, the warm fluid may be input into the top of the fluid storage 320, while cooler fluid directed to the coil 312 may be taken from the bottom of the fluid storage 320. Due to the cooling of the air at the coil 312, the LAT of the air stream 304 is lower than the 150° F. to 320° F. EAT. For example, the LAT of the air stream 304 leaving the coil 312 can be approximately 140° F.

The coil 313 is the next coil encountered by the air stream 304. That is, after the air stream 304 passes over or through the coil 312, the air stream 304 reaches the coil 313. The EAT of the air stream 304 at the coil 313 is approximately the same as the LAT of the air stream 304 at the coil 312, e.g., approximately 140° F. Passing through the coil 313 is fluid that is output from a heat exchanger 306. The EFT of the fluid at the coil 313 is lower than the EAT of the air stream 304. In some embodiments, the EFT of the fluid could be approximately 90° F. As the relatively cooler fluid passes through the coil 313, thermal energy from the warmer air stream 304 is transferred to the fluid, which causes the air stream 304 to be cooler and the fluid to be warmer. In some embodiments, the LFT of the fluid leaving the coil 313 is approximately 110° F. In some embodiments, the fluid is output back to the heat exchanger 306, which is part of another fluid loop, as described in greater detail below. Due to the cooling of the air at the coil 313, the LAT of the air stream 304 is lower than the 140° F. EAT. For example, the LAT of the air stream 304 leaving the coil 313 can be approximately 130° F.

The coil 314 is the next coil encountered by the air stream 304. The EAT of the air stream 304 at the coil 314 is approximately the same as the LAT of the air stream 304 at the coil 313, e.g., approximately 130° F. Passing through the coil 314 is a fluid that is output from a heat exchanger 308. The EFT of the fluid at the coil 314 is lower than the EAT of the air stream 304. In some embodiments, the EFT of the fluid could be approximately 60° F.-70° F. As the relatively cooler fluid passes through the coil 314, thermal energy from the warmer air stream 304 is transferred to the fluid, which causes the air stream 304 to be cooler and the fluid to be warmer. In some embodiments, the LFT of the fluid leaving the coil 314 is approximately 90° F. In some embodiments, the fluid is output back to the heat exchanger 308, which is part of another fluid loop, as described in greater detail below. Due to the cooling of the air at the coil 314, the LAT of the air stream 304 is lower than the 130° F. EAT. For example, the LAT of the air stream 304 leaving the coil 314 can be approximately 70° F.-104° F., which is a suitable temperature range for delivery to the data center 316. Once input to the data center 316, the air stream 304 can provide direct cooling to the data center 316. For example, the air stream 304 can be circulated around one or more heat-generating components (e.g., servers) within the data center 316.

In some embodiments, the heat transfer system 300 also includes the district heating and cooling system 202, which includes the district domestic water 231, the district chilled water 232, the district heat supply water 233, and the district heat return water 234. In some embodiments, the district heating and cooling system 202 can be used as a heat sink or a heat source in the heat transfer system 300.

For example, as shown in FIG. 3A, one side of the heat exchanger 306 includes a fluid loop between the district heat return water 234 and the heat exchanger 306. The other side of the heat exchanger 306 includes the fluid loop between the heat exchanger 306 and the coil 313. Because the fluid from the coil 313 is at a higher temperature than the temperature at the district heat return water 234 (e.g., approximately 110° F. versus approximately 90° F.), the heat exchanger 306 can operate to transfer thermal energy from the fluid from the coil 313 to the district heat return water 234.

As another example, one side of the heat exchanger 308 includes a fluid loop between the district domestic water 231, the heat exchanger 308, and the district heat return water 234. The other side of the heat exchanger 306 includes the fluid loop between the heat exchanger 308 and the coil 314. On the one side, the heat exchanger 308 can receive relatively cooler water (e.g., approximately 60° F.) from the domestic water 231. As discussed above, the heat exchanger 308 receives relatively warmer fluid (e.g., approximately 90° F.) from the coil 314. After thermal energy is exchanged in the heat exchanger 308, the water to be returned to the district heating and cooling system 202 is warmer than the domestic water 231. Thus, the warmer water can be returned to the district heat return water 234 or the domestic water 231 loop at a slightly elevated temperature.

In addition to, or as an alternative to, the fluid loop between the heat exchanger 308 and the district heating and cooling system 202, a fluid loop between the heat exchanger 308 and regional surface water 310 can be employed. The surface water 310 (which can be, e.g., a river, lake, ocean, or man-made pond) can provide relatively cooler water to be used in the heat exchanger 308. In some embodiments, a heat exchanger 326 can be employed between the district heat return water 234 and the fluid loop through the coil 312.

As discussed above, the fluid passing through the coil 312 may be received at least in part from the chiller 322. The chiller 322 operates to produce chilled fluid that is delivered to one or more air handlers 324 associated with the data center 316. The air handlers 324 operate, using the chilled fluid from the chiller 322, to provide direct air cooling to the data center 316 or provide liquid to air direct cooling. The chiller 322 includes any suitable device or system for chilling fluid. In some embodiments, the chiller 322 includes an absorption chiller, an adsorption chiller, or a combination of these.

In some embodiments, the system 300 includes at least one computing device 330 provided to control operations of one or more components of the system 300. For example, the computing device 330 can receive readings from one or more sensors to determine EAT, EFT, and flow rates at one or more of the coils 312-314, determine a desired LAT or LFT, calculate a change in one or more flow rates to achieve the desired LAT or LFT, and/or control one or more valves, actuators, manifolds, or the like to effect the change in the flow rate(s). In some embodiments, the computing device 330 may be a service operated by a third party such as a person or a company. The computing device 330 may be housed and operated at a location different than the location at which the rest of system 300 is located. That is to say, the computing device 330 is not bound to a specific location or configuration. While only one computing device 330 is shown in FIG. 3A, the system 300 could actually include multiple computing devices 330, each providing control to a different part of the system 300.

Although FIGS. 2A and 3A illustrate examples of heat transfer systems for use in a power supply and cooling system and related details, various changes may be made to FIGS. 2A and 3A. For example, the various temperatures described in FIGS. 2A and 3A are merely examples; other embodiments could include different temperatures. Also, the number and arrangement of coils and other components are also merely examples. Various components in the heat transfer systems 200, 300 may be combined, further subdivided, replicated, rearranged, or omitted and additional components may be added according to particular needs.

In addition, various heat sources can be used in a single path or any combination of stages to improve the total heat content available for use in one or more portions of the systems 200, 300 (e.g., in one of the heat exchangers 224, 306, 308). Examples of such heat sources include compression heat from a liquefaction plant, compression heat from air compression, combustion of hydrogen or another combustible fuel, exhaust from an internal combustion engine, rejected heat from an internal combustion engine cooling system, ambient air vaporizers, exhaust from combustible fuel vessels, and the like.

In some embodiments, waste heat from a fuel cell can be captured and reused. For example, such waste heat can be applied to air entering the turbine 203, 303, to air at one or more intermediate stages of the turbine 203, 303, or to exhaust air exiting the turbine 203, 303. Warming of air during a turbine intermediate stage can prevent premature equipment failure, improve equipment efficiency, or a combination of these. Such waste heat could be used instead of burning carbon-based fuel.

In some embodiments, hydrogen can be used in the form of liquid or gas as a non-carbon combustible fuel heat source to heat compressed air directly or through heat exchangers during decompression. Such a process can produce a higher efficiency use of the air stream, produce a higher entering air temperature to reduce degradation and/or damage to internal components caused by thermal shock, or a combination of these. Hydrogen can also be used to heat liquid air directly or through heat exchangers during the turbine cycle to produce a higher efficiency use of the liquid air entering the turboexpander and between turbine stages.

In some embodiments that include one or more existing diesel generators, a generator remote radiator can be used as a heat source. For example, the radiator can be used as a heat source in a liquid-to-liquid transfer within a liquid air energy system. As another example, the radiator can be used as a heat source in a liquid-to-air transfer within a compressed air energy system. Generator exhaust can also be used in a similar manner. In some embodiments, exhaust stack carbon capture can be used to reduce or eliminate carbon dioxide production.

Figure 3B:
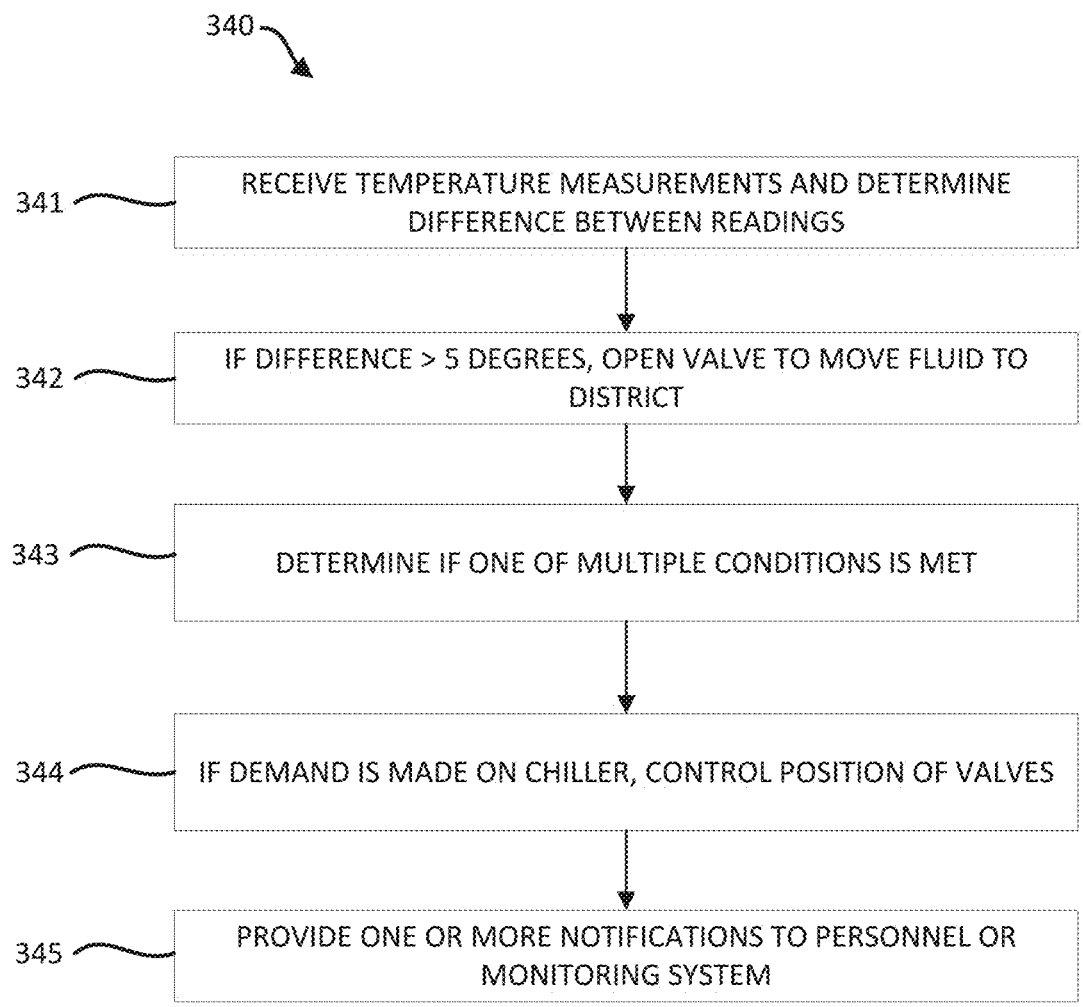
FIGS. 3B through 3D illustrate example methods for performing control operations in a power supply and cooling system according to various embodiments of the present disclosure.

FIG. 3B illustrates an example method 340 for performing control operations in a power supply and cooling system according to various embodiments of the present disclosure. For ease of explanation, the method 340 is described as being performed using the systems 100, 300 of FIGS. 1A and 3A. However, the method 340 may be used with any other suitable device or system. The embodiment shown in FIG. 3B is for illustration only. Other embodiments of the method 340 could be used without departing from the scope of this disclosure.

At operation 341, the computing device 330 receives a temperature reading from the sensors T1 and T3 and determines whether the LFT at the sensor T3 is at least 5° F. greater than the district heat return water 234 temperature at the sensor T1.

At operation 342, if the T3 temperature is at least 5° F. greater than the T1 temperature, then the computing device 330 controls the valve V1 to open, thereby allowing thermal transfer through the heat exchanger 326. This moves fluid to the district heat return water 234. The fluid is diverted to the heat exchanger 326 in a closed loop configuration between the coil 312 and the heat exchanger 326. In some embodiments, the computing device 330 receives a signal from one or more upstream systems that the prime mover is in operation.

At operation 343, the computing device 330 determines if any of the following conditions are met: (1) the upstream prime mover is not operating, (2) the difference in temperature readings between the sensors T1 and T3 is less than 5° F., (3) a user-defined condition is not met, or (4) there is demand made on the chiller 322.

At operation 344, if demand is made on the chiller 322 (as determined in operation 343), then the computing device 330 controls a position of the valves V1 and V2 to open the loop between the coil 312 and the storage tank 320 and close the loop to/from the heat exchanger 326. In some embodiments, the chiller 322 is controlled and monitored with other sensors and controls during the demand period.

At operation 345, the computing device 330 provides one or more notifications to interested personnel or monitoring systems.

Figure 3C:
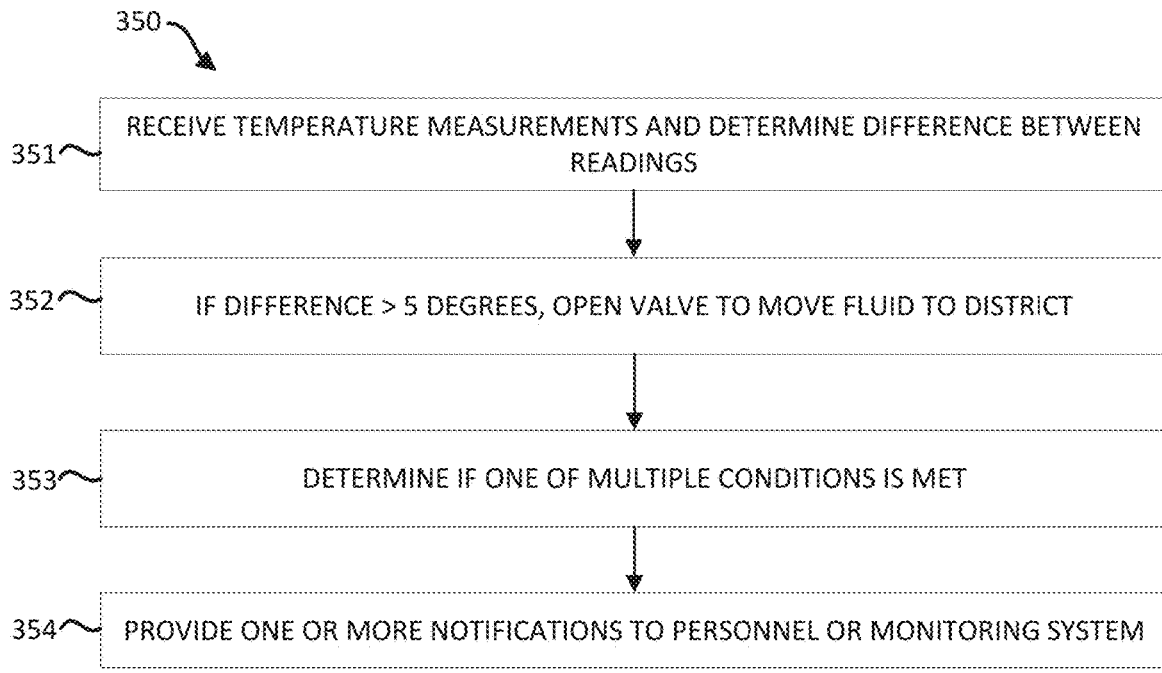

FIG. 3C illustrates an example method 350 for performing control operations in a power supply and cooling system according to various embodiments of the present disclosure. For ease of explanation, the method 350 is described as being performed using the systems 100, 300 of FIGS. 1A and 3A. However, the method 350 may be used with any other suitable device or system. The embodiment shown in FIG. 3C is for illustration only. Other embodiments of the method 350 could be used without departing from the scope of this disclosure.

At operation 351, the computing device 330 receives a temperature reading from the sensors T1 and T4 and determines whether the LFT at the sensor T4 is at least 5° F. greater than the district heat return water 234 temperature at the sensor T1.

At operation 352, if the T4 temperature is at least 5° F. greater than the T1 temperature, then the computing device 330 controls the valve V3 to open, thereby allowing thermal transfer through the heat exchanger 306. This moves fluid to the district heat return water 234. The fluid is diverted to the heat exchanger 306 in a closed loop configuration between the coil 313 and the heat exchanger 306. In some embodiments, the computing device 330 receives a signal from one or more upstream systems that the prime mover is in operation.

At operation 353, the computing device 330 determines if any of the following conditions are met: (1) the upstream prime mover is not operating, (2) the difference in temperature readings between the sensors T1 and T4 is less than 5° F., or (3) a user-defined condition is not met.

At operation 354, the computing device 330 provides one or more notifications to interested personnel or monitoring systems.

Figure 3D:
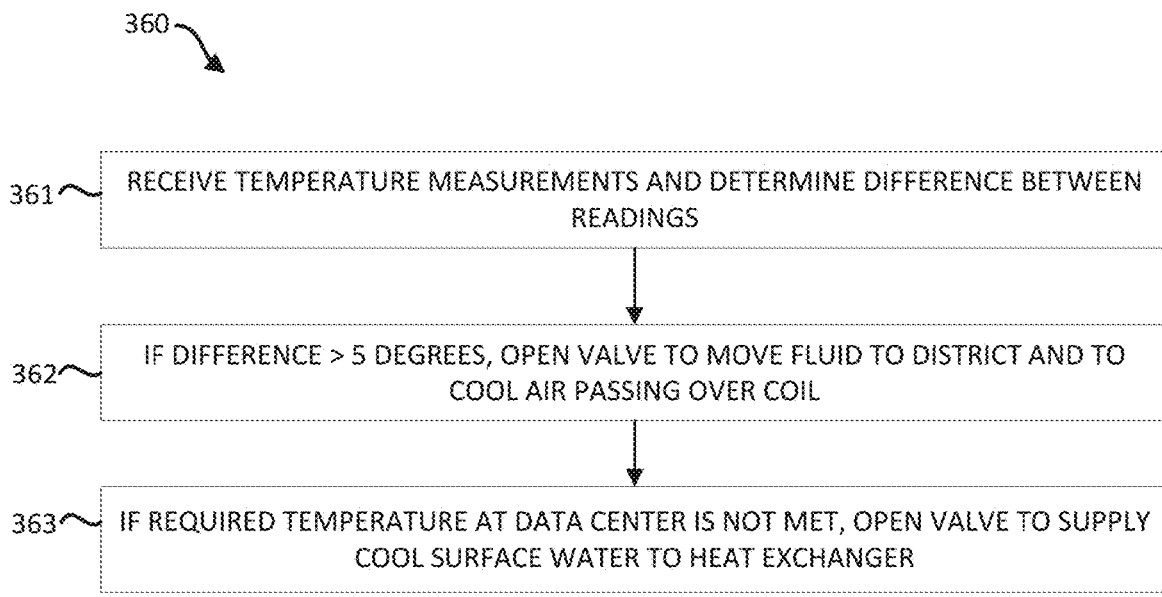

FIG. 3D illustrates an example method 360 for performing control operations in a power supply and cooling system according to various embodiments of the present disclosure. For ease of explanation, the method 360 is described as being performed using the systems 100, 300 of FIGS. 1A and 3A. However, the method 360 may be used with any other suitable device or system. The embodiment shown in FIG. 3D is for illustration only. Other embodiments of the method 360 could be used without departing from the scope of this disclosure.

At operation 361, the computing device 330 receives temperature measurements from the temperature sensors T1, T2, T5, and T7. In some embodiments, the temperature sensor T7 is the control input for the data center 316. The computing device 330 determines whether the LFT at the sensor T5 is at least 5° F. greater than the district heat return water 234 temperature at the sensor T1.

At operation 362, if the T5 temperature is at least 5° F. greater than the T1 temperature, then the computing device 330 controls the valve V5 to open, thereby allowing movement of fluid between the heat exchanger 308 and the district. This also has the effect of cooling the air passing over the coil 314 to the prescribed air temperature for the data center 316 as measured by the sensor T7.

At operation 363, if the prescribed air temperature for the data center 316 is not met, then the computing device 330 controls the valve V6 to open, thereby supplying cool surface water to the heat exchanger 308. This is turn removes heat from the air stream over the coil 314 in order to meet the prescribed air temperature for the data center 316 as measured by the sensor T7.

The methods discussed above with regard to FIGS. 3B through 3D illustrate example operations that can be implemented in accordance with the principles of the present disclosure. Various changes could be made to the methods illustrated herein. For example, while shown as a series of steps, various steps in each figure could overlap, occur in parallel, occur in a different order, or occur multiple times. In another example, steps may be omitted or replaced by other steps. Also, it will be understood that multiple ones or all of the methods discussed above with regard to FIGS. 3B through 3D can be performed together in the system 300.

Figure 4A:
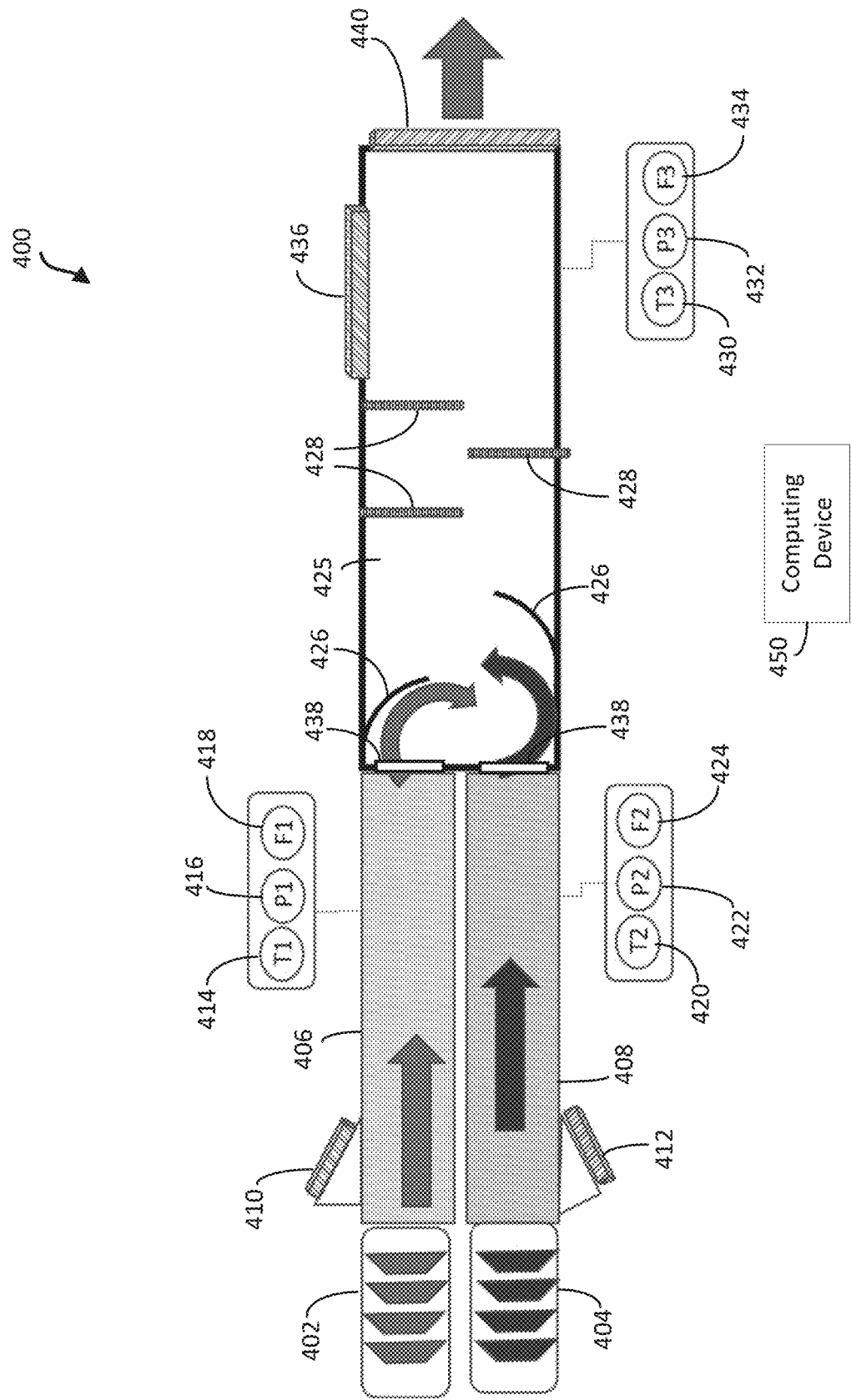
FIG. 4A illustrates an example of a hybrid compressed air/liquid air power supply and cooling system according to various embodiments of the present disclosure.

FIG. 4A illustrates an example of a hybrid compressed air/liquid air power supply and cooling system 400 according to various embodiments of the present disclosure. For ease of explanation, the system 400 is described as being used in conjunction with the power supply and cooling system 100 of FIG. 1A. Of course, this is merely one example. The system 400 could be used with any other suitable system. Also, the embodiment of the system 400 shown in FIG. 4A is for illustration only. Other embodiments of the system 400 could be used without departing from the scope of this disclosure.

As illustrated in FIG. 4A, the system 400 include two prime movers (or turbines) 402, 404. Each of the turbines 402, 404 can represent (or be represented by) the power supply system 109 of FIG. 1A. The turbine 402 is part of a compressed air energy system and generates relatively cold exhaust at a temperature less than 30° F. In some embodiments, the exhaust stream of the turbine 402 is at a temperature of approximately −150° F. The cold exhaust stream initially flows through a duct 406 that includes a high-pressure waste gate 410 to expel excess exhaust. Sensors associated the duct 406 include a temperature sensor 414, a pressure sensor 416, and a flow sensor 418 for measuring the temperature, pressure, and flow rate, respectively, of the cold exhaust stream in the duct 406.

The turbine 404 is part of a liquid air energy system and generates relatively warm exhaust at a temperature greater than 30° F. In some embodiments, the exhaust stream of the turbine 402 is at a temperature of approximately 150° F. The warm exhaust stream initially flows through a duct 408 that includes a high-pressure waste gate 412 to expel excess exhaust. Sensors associated the duct 408 include a temperature sensor 420, a pressure sensor 422, and a flow sensor 424 for measuring the temperature, pressure, and flow rate, respectively, of the warm exhaust stream in the duct 408.

The paths of the ducts 406, 408 converge into a single duct 425, thereby forming a "Y" arrangement. In the duct 425, the cold exhaust stream from the duct 406 and the warm exhaust stream from the duct 408 mix to form a single exhaust stream. Dampers 438 at the interface between the ducts 406 and 425 and at the interface between the ducts 408 and 425 can be operated to control the air flow from each duct 406, 408 into the duct 425. One or more vanes 426 and baffles 428 disposed within the duct 425 disturb the air flow, further causing mixture of the cold and warm exhaust streams. Sensors associated the duct 425 include a temperature sensor 430, a pressure sensor 432, and a flow sensor 434 for measuring the temperature, pressure, and flow rate, respectively, of the combined exhaust stream in the duct 425. If any of the measured properties (i.e., temperature, pressure, or flow rate) is not within a desired range, the dampers can be operated to change the ratio of warm and cold exhaust. In addition, a waste gate 436 can be operated to release non-specification waste exhaust from the duct 425. Exhaust air that is within the desired temperature, pressure, and flow rate range can be output through an outlet 440, and delivered to a data center (e.g., the electrical load 120 of FIG. 1A) for cooling.

In some embodiments, the system 400 includes at least one computing device 450 provided to control operations of one or more components of the system 400. For example, the computing device 450 can obtain measurements from one or more of the sensors 414, 416, 418, 420, 422, 424, 430, 432, 434, determine desired temperatures and/or air flow rates, and control operation of one or more dampers, waste gates, or the like to effect the desired change(s). In some embodiments, the computing device 450 may be a service operated by a third party such as a person or a company. The computing device 450 may be housed and operated at a location different than the location at which the rest of system 400 is located. That is to say, the computing device 450 is not bound to a specific location or configuration. While only one computing device 450 is shown in FIG. 4A, the system 400 could actually include multiple computing devices 450, each providing control to a different part of the system 400.

In some embodiments, a solar fluid heater (e.g., similar to the heater 206 in FIG. 2A) can be connected to one or more liquid-to-liquid heat exchangers at the turbine 404 to heat entering liquid air during and/or between stages of the turbine 404 to improve prime mover efficiency.

Figure 4B:
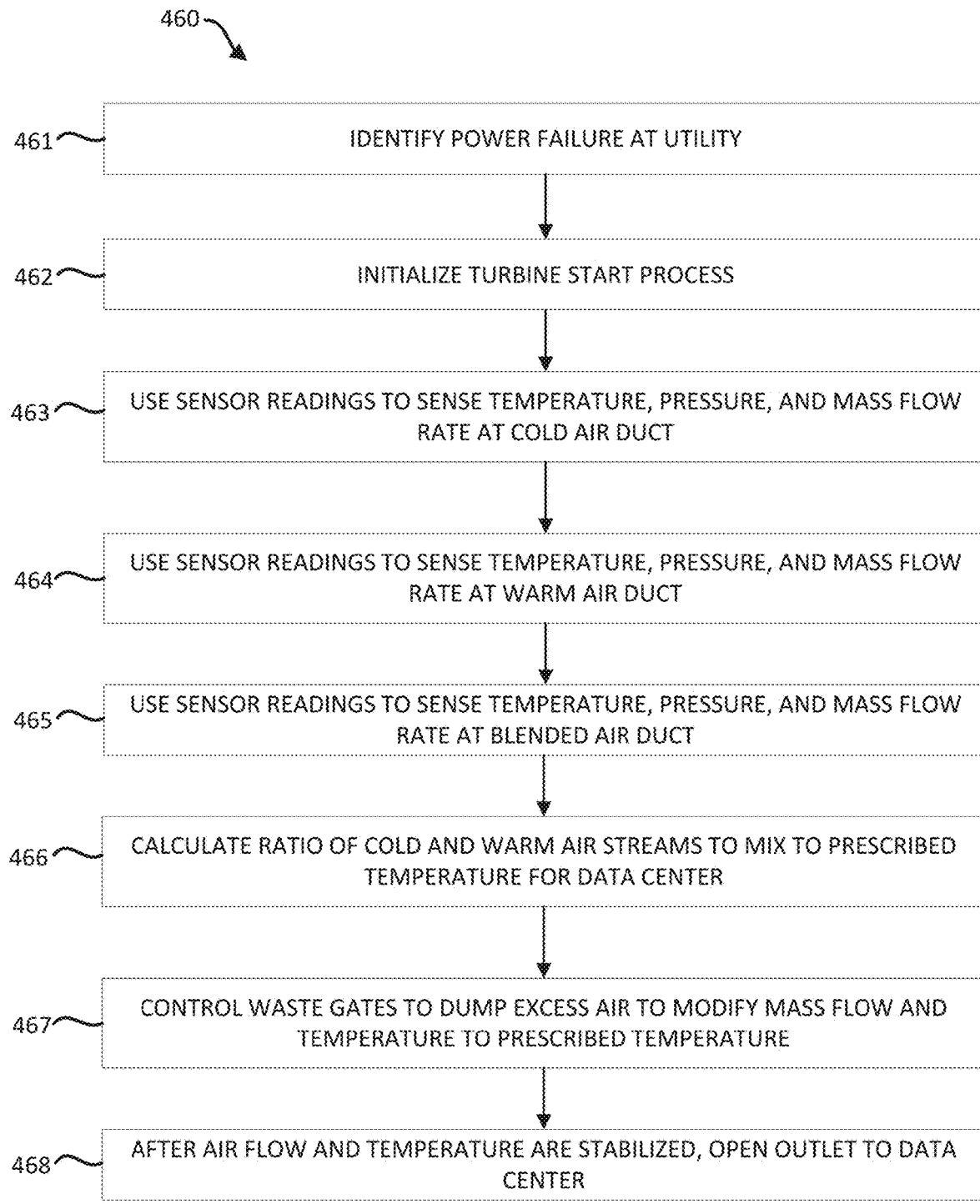
FIG. 4B illustrates an example method for performing control operations in a power supply and cooling system according to various embodiments of the present disclosure.

FIG. 4B illustrates an example method 460 for performing control operations in a power supply and cooling system according to various embodiments of the present disclosure. For ease of explanation, the method 460 is described as being performed using the systems 100, 400 of FIGS. 1A and 2A. However, the method 460 may be used with any other suitable device or system. The embodiment shown in FIG. 4B is for illustration only. Other embodiments of the method 460 could be used without departing from the scope of this disclosure.

At operation 461, a power failure at the utility is identified by one or more energy sensors at the utility meter. This serves as a signal for the turbines 402, 404 to start up.

At operation 462, the turbine start process is initialized. This can include, for example, discharging the turbine spinning reserve air tank, disengaging the spinning motor, or a combination of these. Also, the system synchronizes and parallel electrical outputs, and transfers critical load to generator(s). Each turbine 402 and 404 includes a rotary flywheel and/or electrical storage battery (not shown), which maintains critical load during the starting cycle of each turbine 402, 404.

At operation 463, the computing device 450 uses data received from the temperature sensor 414, the pressure sensor 416, and the flow sensor 418 to sense the cold exhaust stream temperature, pressure, and mass flow rate, respectively, within (or at the output of) the duct 406.

At operation 464, the computing device 450 uses data received from the temperature sensor 420, the pressure sensor 422, and the flow sensor 424 to sense the warm stream temperature, pressure, and mass flow rate, respectively, within (or at the output of) the duct 408.

At operation 465, the computing device 450 uses data received from the temperature sensor 430, the pressure sensor 432, and the flow sensor 434 to sense the blended air stream temperature, pressure, and mass flow rate, respectively, within (or at the output of) the duct 425.

At operation 466, the computing device 450 calculates the correct ratio of cold and warm air streams to mix to the prescribed temperature for the data center. Here, the prescribed temperature is 70° F.-104° F.

At operation 467, the computing device 450 controls the waste gates 410, 412 to dump excess air in order to modify the mass flow and temperature to the prescribed temperature. Initially, the air is vented to the atmosphere through the waste gate 436 while the air flow rate and temperature stabilize.

At operation 468, the computing device 450 determines that the air flow and temperature have been stabilized for a prescribed period of time. In response, the computing device 450 controls the waste gate 436 to close and controls the outlet 440 to open. The air flow then enters the data center at the correct temperature and pressure for cooling requirements. Over time, the computing device 450 can continue to monitor the air flow to the data center and adjust as needed.

Figure 5:
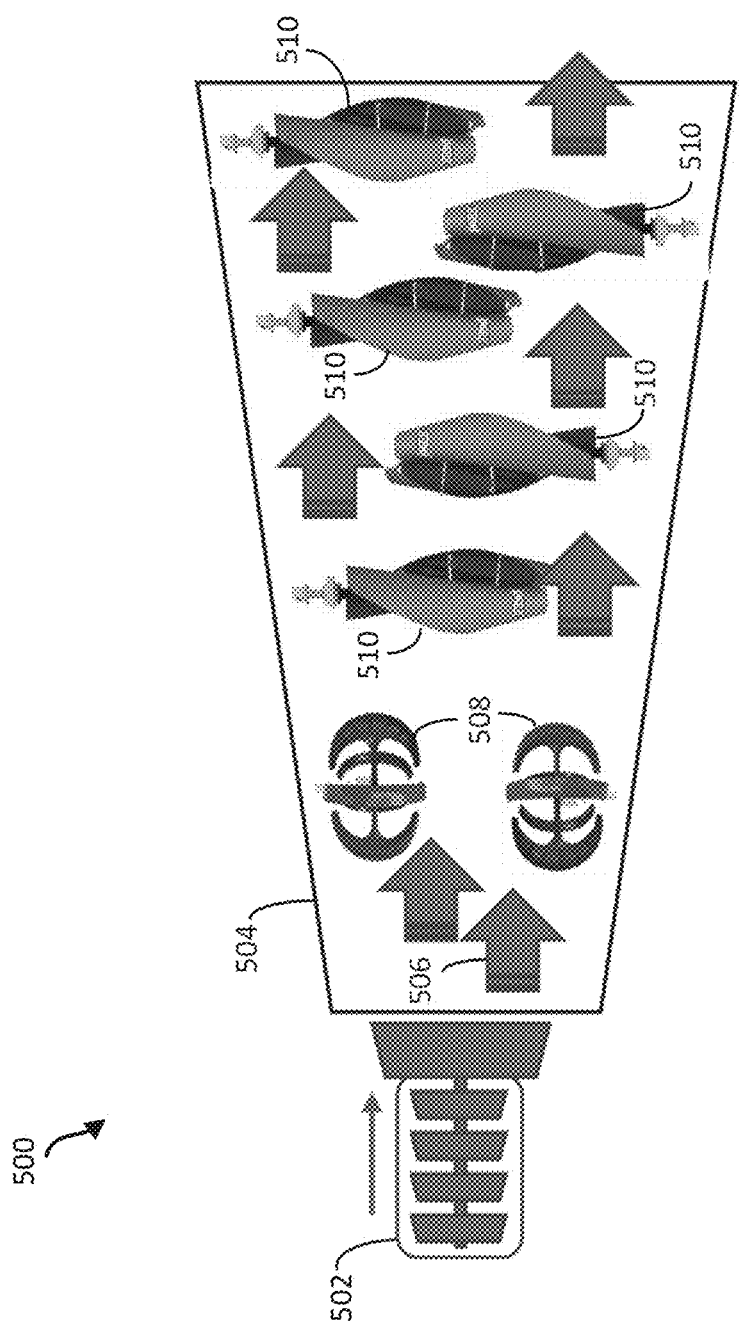
FIG. 5 illustrates an example system for generating power using turbine exhaust according to various embodiments of the present disclosure.

FIG. 5 illustrates an example system 500 for generating power using turbine exhaust according to various embodiments of the present disclosure. For ease of explanation, the system 500 is described as being used in conjunction with one or more of the systems described in FIGS. 1A through 4A. Of course, this is merely one example. The system 500 could be used with any other suitable system. Also, the embodiment of the system 500 shown in FIG. 5 is for illustration only. Other embodiments of the system 500 could be used without departing from the scope of this disclosure.

As shown in FIG. 5, the system 500 includes a turbine 502. The turbine 502 can represent (or be represented by) the power supply system 109 of FIG. 1A. In some embodiments, the turbine 502 is part of a compressed air energy system, similar to the turbine 402 of FIG. 4A. In other embodiments, the turbine 502 is part of a liquid air energy system, similar to the turbine 404 of FIG. 4A. During operation, the turbine 502 generates an exhaust stream 506 that flows through a duct 504. Depending on the type of system, the exhaust stream 506 can have a velocity exceeding 50 miles per hour (MPH) and a pressure exceeding 20 pounds per square inch absolute (psia). Of course, these values are merely examples; other values could be higher or lower and are within the scope of this disclosure.

Inside the duct 504 and in the path of the exhaust stream 506 are multiple power generation devices, including one or more pinwheel generators 508 and one or more turbine generators 510. As the exhaust stream 506 flows by each of the generators 508, 510, the generators 508, 510 spin, thereby generating small amounts of power. Such power can be used to operate control devices that require little power, such as actuators, valves, sensors, and the like. As an additional benefit, the generators 508, 510 act as obstacles that can lower the velocity and pressure of the exhaust stream 506. This may be useful for changing the pressure and air flow to be within a desired range, such as for flow through a coil (e.g., the coils 212-214, 312-314 of FIGS. 2A and 3A) or through one or more downstream ducts (e.g., the ducts 406, 408, 425 of FIG. 4A). Additionally or alternatively, the duct 504 can include one or more wheels, vanes, blades, or the like, that move, vibrate, or rotate due to the movement of the exhaust stream 506. Such wheels, vanes, blades, or the like can, in turn, actuate or operate one or more shafts, gears, pumps, or other devices that are capable of movement. For example, a spinning vane in the duct 504 can operate a hydraulic pump that moves one or more of the fluids described in FIGS. 2A and 3A.

Figure 6A:
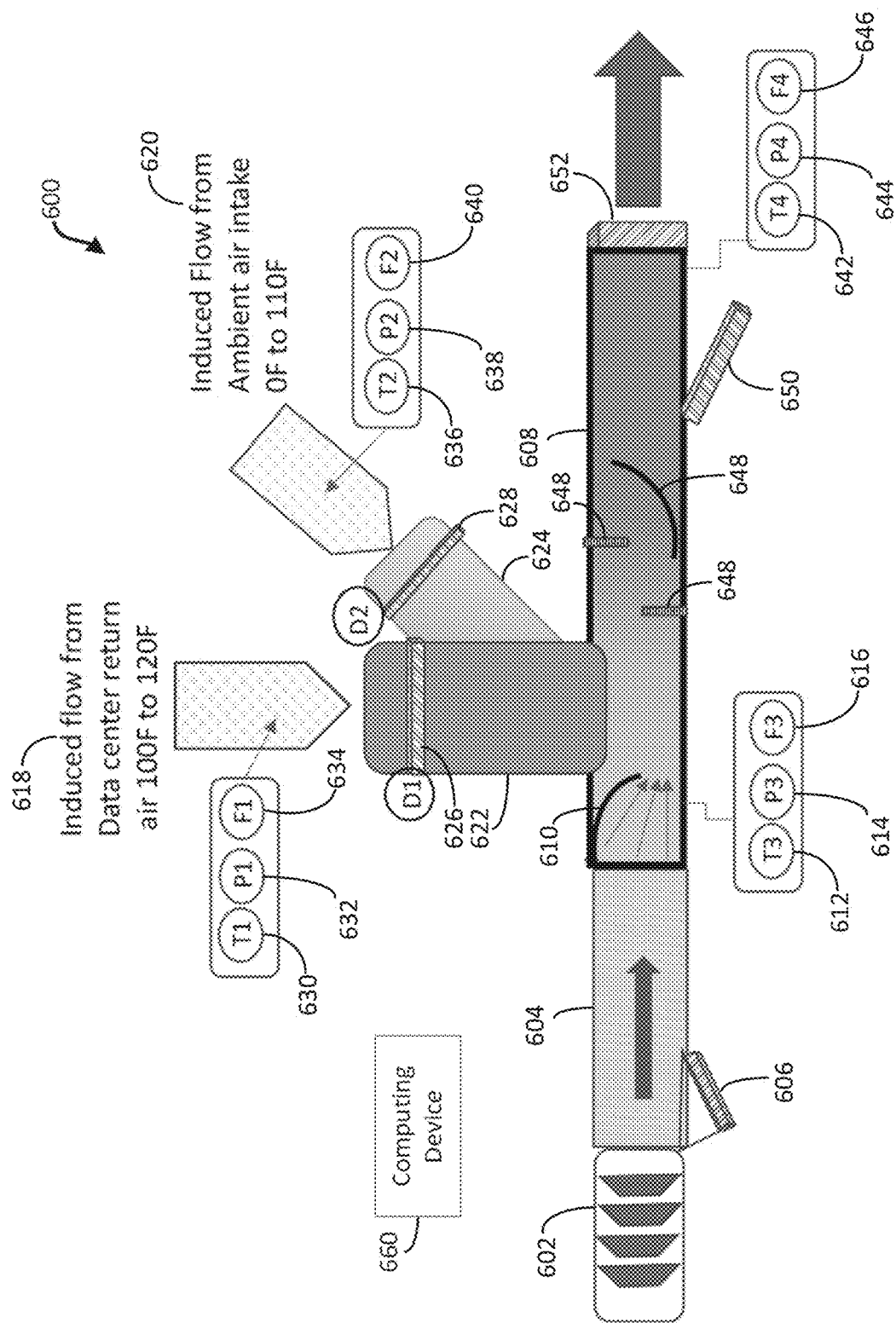
FIG. 6A illustrates an example system that uses air induction to condition prime mover exhaust according to various embodiments of the present disclosure.

FIG. 6A illustrates an example an example system 600 that uses air induction to condition prime mover exhaust according to various embodiments of the present disclosure. To achieve the correct supply air temperature for data center cooling without the use of common fluids to heat or cool the prime mover air stream through air-to-fluid transfers, the use of air induction via the Venturi effect can be employed. As described below, the mixing of available data center return air with ambient exterior air in calculated ratios can produce a prescribed LAT from the system 600 to the data center.

For ease of explanation, the system 600 is described as being used in conjunction with the power supply and cooling system 100 of FIG. 1A. Of course, this is merely one example. The system 600 could be used with any other suitable system. Also, the embodiment of the system 600 shown in FIG. 6A is for illustration only. Other embodiments of the system 600 could be used without departing from the scope of this disclosure.

As illustrated in FIG. 6A, the system 600 include a prime mover (or turbine) 602. The turbine 602 can represent (or be represented by) the power supply system 109 of FIG. 1A. Depending on the embodiment, the turbine 602 can be part of a compressed air energy system or a liquid air energy system. When the turbine 602 is part of a compressed air energy system, the turbine 602 generates relatively cold exhaust at a temperature less than 30° F. In some embodiments, the exhaust stream of the turbine 602 is at a temperature of approximately −150° F. When the turbine 602 is part of a liquid air energy system, the turbine 602 generates relatively warm exhaust at a temperature greater than 30° F. In some embodiments, the exhaust stream of the turbine 602 is at a temperature of approximately 150° F.

The exhaust stream initially flows through a first duct 604 that includes a high pressure waste gate 606 to expel excess exhaust. In some embodiments, the waste gate 606 is biased in an open position due to gravity and can be powered closed when required. The exhaust stream then enters a second duct 608, where the exhaust is mixed with other air, as described below. One or more vanes or baffles 610 disposed near the entrance to the second duct 608 constrict the air flow and cause a reduction in fluid pressure and an increase in fluid velocity (i.e., the Venturi effect). Sensors disposed near the entrance of the second duct 608 include a temperature sensor 612, a pressure sensor 614, and a flow sensor 616 for measuring the temperature, pressure, and flow rate, respectively, of the exhaust stream entering the second duct 608.

Additional air is introduced into the second duct 608 through induced flow. That is, because the exhaust stream from the turbine 602 is at a high pressure and velocity, the additional air can be drawn (or induced) into the second duct 608. The additional air sources include data center return air 618 and ambient outside air 620. In some embodiments, each air source 618 and 620 flows through a corresponding duct 622 and 624 before entering the second duct 608. Dampers 626 and 628 in each duct 622 and 624 can be operated to control the air flow from each duct 622 and 624 into the second duct 608. Sensors disposed in the air stream through each duct 622 and 624 include temperature sensors 630 and 636, pressure sensors 632 and 638, and flow sensors 634 and 640 for measuring the temperature, pressure, and flow rate, respectively, of the air streams in the ducts 622 and 624.

In the second duct 608, the exhaust stream from the first duct 604, the data center return air 618, and the ambient outside air 620 mix to form a single air stream. When the turbine 602 is part of a compressed air energy system, the temperature of the cold exhaust stream is raised due to the mixing with the relatively warmer data center return air 618 and ambient outside air 620. Conversely, when the turbine 602 is part of a liquid air energy system, the temperature of the warm exhaust stream is lowered due to the mixing with the relatively colder data center return air 618 and ambient outside air 620. One or more vanes or baffles 648 disposed within the second duct constrict or disturb the air flow, further causing mixture of the exhaust stream with the data center return air 618 and ambient outside air 620.

Sensors associated the second duct 608 include a temperature sensor 642, a pressure sensor 644, and a flow sensor 646 for measuring the temperature, pressure, and flow rate, respectively, of the combined air stream in the second duct 608. If any of the measured properties (i.e., temperature, pressure, or flow rate) is not within a desired range, one or more of the dampers 626 and 628 can be operated to change the ratio of air streams (e.g., as a sensor-controlled damper). In addition, a waste gate 650 can be operated to release non-specification waste air from the second duct 608. In some embodiments, the waste gate 650 is biased in an open position due to gravity, and can be powered closed when required. Exhaust air that is within the desired temperature, pressure, and flow rate range can be output through an outlet 652, and delivered to a data center (e.g., the electrical load 120 of FIG. 1A) for cooling.

In some embodiments, the system 600 includes at least one computing device 660 provided to control operations of one or more components of the system 600. For example, the computing device 660 can obtain measurements from one or more of the sensors 612-616, 630-646, determine desired temperatures and/or air flow rates, and control operation of one or more dampers, waste gates, or the like to effect the desired change(s). In some embodiments, the computing device 660 may be a service operated by a third party such as a person or a company. The computing device 660 may be housed and operated at a location different than the location at which the rest of system 600 is located. That is to say, the computing device 660 is not bound to a specific location or configuration. While only one computing device 660 is shown in FIG. 6A, the system 600 could actually include multiple computing devices 660, each providing control to a different part of the system 600.

The system 600 provides advantageous benefits compared to conventional mechanical systems using air induction. Such conventional systems typically employ high-power fans to create the necessary high-pressure, high-volume air stream to induce another air source into the air stream. In contrast, the system 600 does not require any high-power fans. Energy use is primarily limited to control systems (e.g., the computing device 660) and power actuated dampers.

Figure 6B:
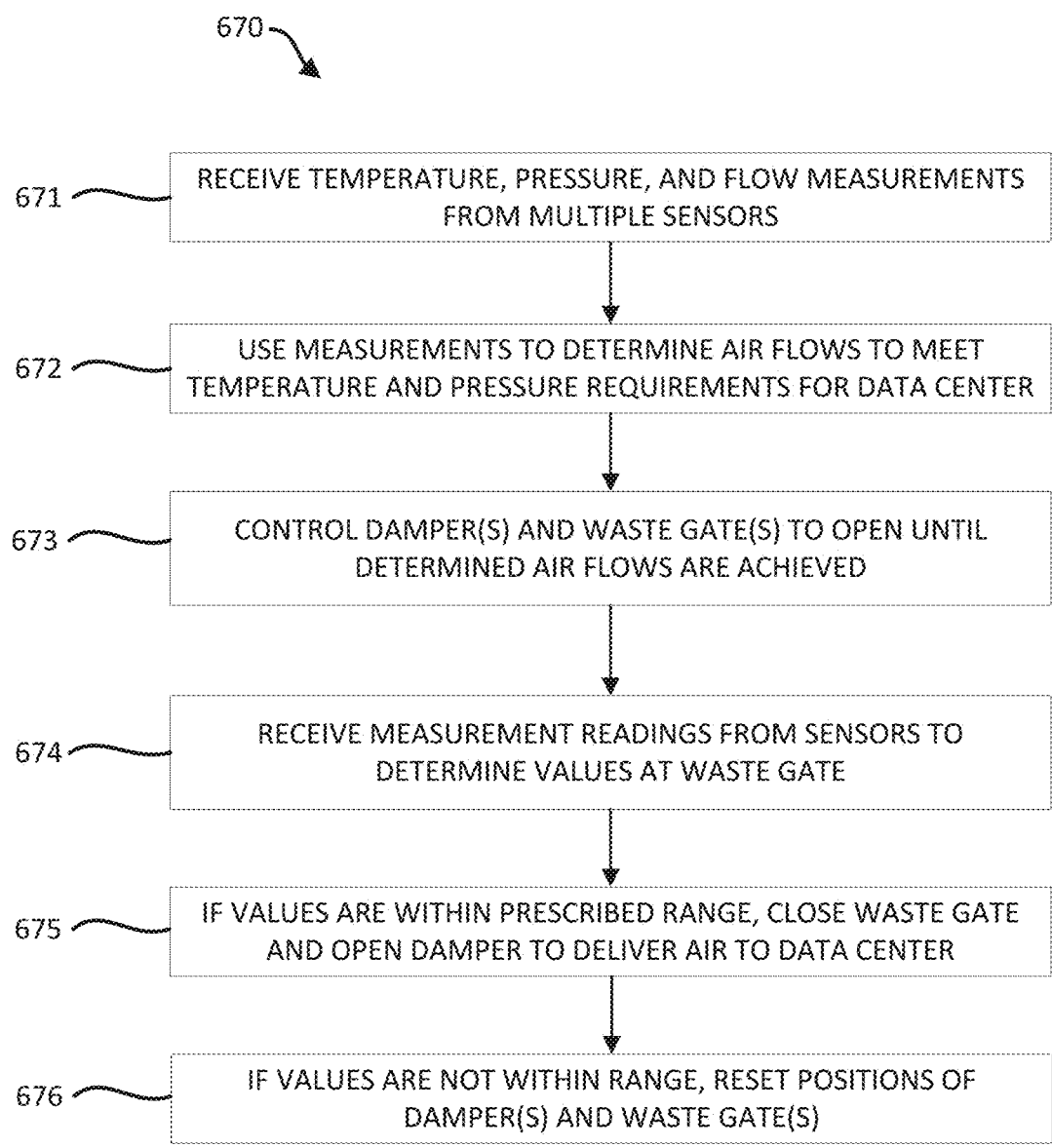
FIG. 6B illustrates an example method for performing control operations in a power supply and cooling system according to various embodiments of the present disclosure.

FIG. 6B illustrates an example method 670 for performing control operations in a power supply and cooling system according to various embodiments of the present disclosure. For ease of explanation, the method 670 is described as being performed using the systems 100, 600 of FIGS. 1A and 6A. However, the method 670 may be used with any other suitable device or system. The embodiment shown in FIG. 6B is for illustration only. Other embodiments of the method 670 could be used without departing from the scope of this disclosure.

The method 670 starts with the waste gates 606, 650 in an open state. At operation 671, the computing device 660 receives measurement readings from the multiple temperature, pressure, and flow sensors 612-616, 630-646.

At operation 672, the computing device 660 performs calculations on the measurement readings obtained in operation 671 to determine required air flows from the data center return and ambient air sources, in order to meet prescribed air temperature and air pressure requirements for the data center.

At operation 673, the computing device 660 controls the damper 626, the damper 628, and the waste gate 606 to open until the determined air flow rates are achieved. For example, the position of the damper 626 can be determined based on whether the prime mover exhaust is above, below, or at ambient temperature.

At operation 674, the computing device 660 receives measurement readings from the sensors 642-646 to determine supply air values at the waste gate 650.

At operation 675, if the computing device 660 determines that the supply air values determined in operation 674 are within the prescribed range, then the computing device 660 controls the waste gate 650 to close and controls the outlet 652 to open to deliver the conditioned air to the data center.

At operation 676, if the computing device 660 determines that the supply air values determined in operation 674 are out of specification, then the computing device 660 recalculates and resets the positions of the damper 626, the damper 628, and the waste gate 606.

The method 670 illustrates example operations that can be implemented in accordance with the principles of the present disclosure. Various changes could be made to the method 670. For example, while shown as a series of steps, various steps could overlap, occur in parallel, occur in a different order, or occur multiple times. In another example, steps may be omitted or replaced by other steps.

In some embodiments, energy for use at the power plant can be purchased virtually when cost economics make such a purchase favorable. The energy spot price for the lowest Short-Run Marginal Cost (SRMC) can be monitored automatically or manually by one or more operators, technicians, or other users. Such purchases can make it more economical to operate a power supply and cooling system such as the power supply and cooling system 100 of FIG. 1A.

One or more pressure monitoring inputs can identify if a need exists to charge or top off the air pressure in any above ground or below ground storage vessels. If a low pressure condition exists, the compressors' start sequence will change to auto start. If energy costs meet or exceed the cost target requirements per the monitoring function, the compressors can be automatically started (e.g., immediately or after a user-defined delay time) if a low pressure or targeted energy price point condition exists.

In some embodiments, a notification is sent to the site operator (e.g., via a mobile app) that the low pressure and price target conditions exist, thus, an auto start will take place at the end of a predetermined time period (e.g., ten minutes). The site operator can then respond from a control console or the mobile app. For example, the site operator can confirm the automatic start, which starts the compressors and the fill process. In some embodiments, the site operator can abort the automatic start, or the site operator can change the start time (e.g., delay by thirty minutes or an hour).

The system logs the operator response. If the operator aborts, then all start systems may need a manual intervention to reset. If the operator confirms the automatic start or changes the time of the automatic start, then the system starts the fill operation and fills the vessels to the prescribed pressure. In some embodiments, the prescribed pressure during the charging cycle is a combination of pressure and temperature. In some embodiments, readings from one or more pressure sensors or thermal sensors can be provided as inputs to the system. In response, the system can adjust the final pressure based on a programmed pressure thermal table. When the design pressure is met, or the cost of energy exceeds the programmed input, the system shuts down. In some embodiments, a notification is sent to the operator indicating if the system shutdown is due to the energy price out of bounds with operator capability to continue compressor operation to meet operation or business objectives.

Figure 7:
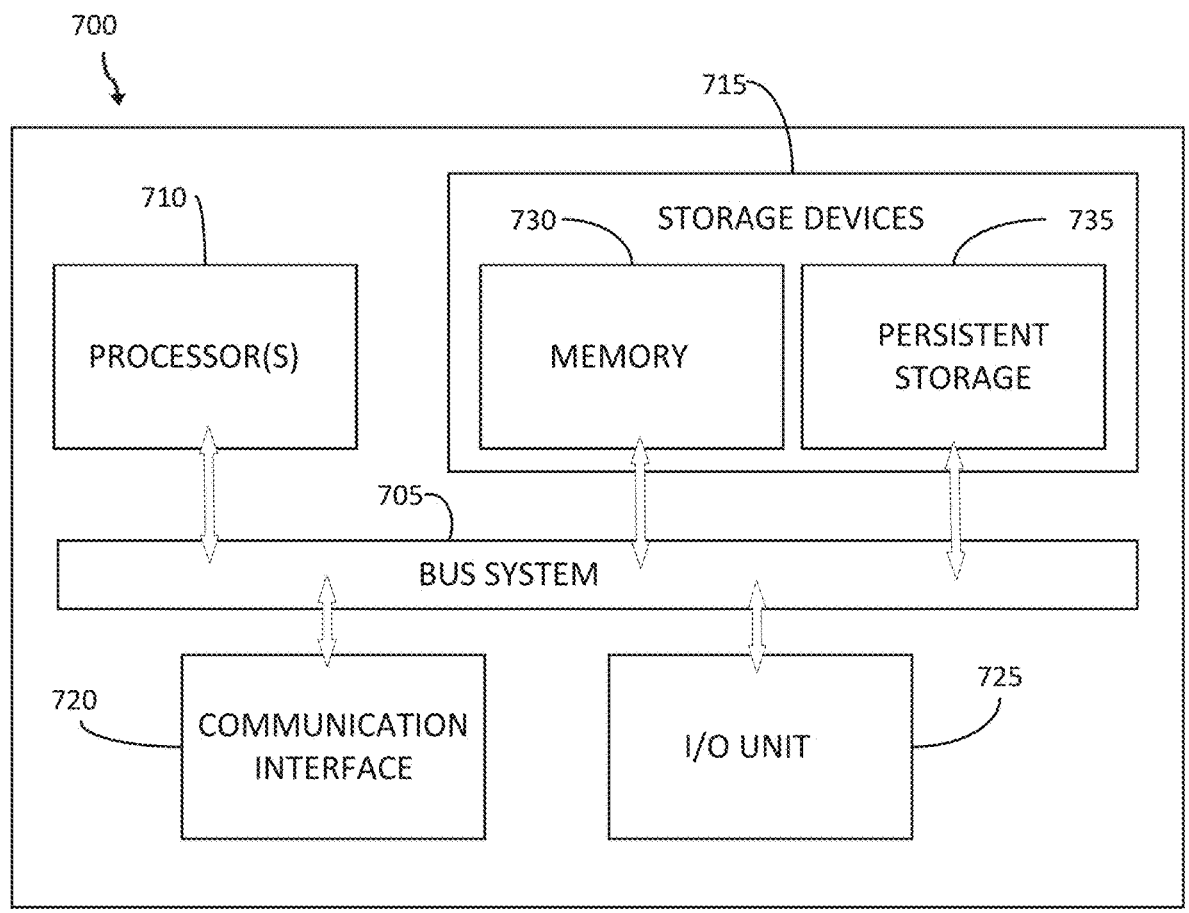
FIG. 7 illustrates an example of a computing device in a power supply and cooling system according to various embodiments of the present disclosure.

FIG. 7 illustrates an example of a computing device 700 in a power supply and cooling system according to various embodiments of the present disclosure. The computing device 700 can represent any of the computing devices 104, 190, 230, 330, 450, 660 discussed above in FIGS. 1A through 6A. The computing device 700 can be configured to control any of the operations discussed herein, including operations in the methods discussed above.

As shown in FIG. 7, the computing device 700 includes a bus system 705, which supports communication between processor(s) 710, storage devices 715, communication interface (or circuit) 720, and input/output (I/O) unit 725. The processor(s) 710 executes instructions that may be loaded into a memory 730. The processor(s) 710 may include any suitable number(s) and type(s) of processors or other devices in any suitable arrangement. Example types of processor(s) 710 include microprocessors, microcontrollers, digital signal processors, field programmable gate arrays, application specific integrated circuits, and discrete circuitry.

The memory 730 and a persistent storage 735 are examples of storage devices 715, which represent any structure(s) capable of storing and facilitating retrieval of information (such as data, program code, and/or other suitable information on a temporary or permanent basis). The memory 730 may represent a random access memory or any other suitable volatile or non-volatile storage device(s). The persistent storage 735 may contain one or more components or devices supporting longer-term storage of data, such as a read-only memory, hard drive, Flash memory, or optical disc. For example, persistent storage 735 may store one or more databases of data, standards data, results, data, client applications, etc.

The communication interface 720 supports communications with other systems or devices. For example, the communication interface 720 could include a network interface card or a wireless transceiver facilitating communications over the system 200 or system 100. The communication interface 720 may support communications through any suitable physical or wireless communication link(s). The I/O unit 725 allows for input and output of data. For example, the I/O unit 725 may provide a connection for user input through a keyboard, mouse, keypad, touchscreen, or other suitable input devices. The I/O unit 725 may also send output to a display, printer, or other suitable output devices.

Although FIG. 7 illustrates one example of a computing device 700, various changes may be made to FIG. 7. For example, various components in FIG. 7 could be combined, further subdivided, or omitted and additional components could be added according to particular needs. As a particular example, while depicted as one system, the computing device 700 may include multiple computing systems that may be remotely located. In another example, the computing device 700 may be a personal electronic device, such as, a phone, tablet, or laptop, or provide or update a user interface, e.g., via a software application, or other communications interface to a personal electronic device for control, management, information, and or access to the computing device 700 and/or any aspects of the systems disclosed herein.

It is noted that various figures and portions of the specification list example temperatures or temperature ranges. These are provided by way of example only and any suitable alternative temperature or temperature range may be used in embodiments of the present disclosure.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "such as," when used among terms, means that the latter recited term(s) is(are) example(s) and not limitation(s) of the earlier recited term. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described herein can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer readable program code. The phrase "computer-readable program code" includes any type of computer code, including source code, object code, and executable code. The phrase "computer-readable medium" includes any type of medium capable of being accessed by a computer, such as read-only memory (ROM), random access memory (RAM), a hard disk drive, a compact disc (CD), a digital video disc (DVD), or any other type of memory. A "non-transitory" computer-readable medium excludes wired, wireless, optical, or other communication links that transport transitory electrical or other signals. A non-transitory, computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases. Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of the patented subject matter is defined by the claims.

What is claimed is:

1. A method comprising:
receiving temperature measurements from multiple temperature sensors in a power supply system that includes multiple coils arranged in a series downstream of a turbine, each coil configured to receive thermal energy from an air stream exhausted from the turbine as the air stream moves toward a data center, each coil associated with at least one fluid loop;
using a first subset of the temperature measurements to determine a blended fluid mix from a primary fluid path and a heated fluid reservoir in order to obtain a predetermined leaving fluid temperature at a first coil of the multiple coils; and
controlling a position of one or more valves associated with the primary fluid path and the heated fluid reservoir to achieve the determined blended fluid mix.

2. The method of claim 1, wherein the first coil is part of a first fluid loop that includes a close coupled cooling (CCC) coil associated with the data center.

3. The method of claim 1, further comprising:
using a second subset of the temperature measurements to determine an updated fluid flow rate through a second coil of the multiple coils in order to obtain a predetermined leaving fluid temperature at the second coil; and
controlling one or more pumps or valve positions associated with the second coil to change a current fluid flow rate to the updated fluid flow rate.

4. The method of claim 3, wherein the second coil is part of a second fluid loop that cools air passing through one or more air handlers that provide cooled air to the data center.

5. The method of claim 3, further comprising:
using a third subset of the temperature measurements to determine a fluid flow rate from the heated fluid reservoir in order to obtain a predetermined leaving fluid temperature, of fluid in a third fluid loop that travels through a third coil of the multiple coils, in the third coil, wherein the third coil is furthest downstream from the turbine of the multiple coils; and
controlling one or more pumps or valve positions associated with the heated fluid reservoir to change a current fluid flow rate from the heated fluid reservoir to the determined fluid flow rate.

6. The method of claim 1, further comprising:
using a fourth subset of the temperature measurements to determine if a difference between (i) a temperature of a fluid before entering the first coil and (ii) a temperature of district heat return water is greater than a threshold temperature difference; and
in response to determining that the difference is greater than the threshold temperature difference, controlling one or more valves associated with a heat exchanger to open in order to divert at least a portion of the fluid to the heat exchanger for thermal transfer with the district heat return water.

7. The method of claim 1, wherein the turbine is a component of the power supply system configured to supply electrical energy to a load in the data center that is cooled by fluid traveling through the first coil.

8. A device comprising:
a memory configured to store instructions; and
a processor operably connected to the memory, the processor configured, when executing the instructions, to:
receive temperature measurements from multiple temperature sensors in a power supply system that includes multiple coils arranged in a series downstream of a turbine, each coil configured to receive thermal energy from an air stream exhausted from the turbine as the air stream moves toward a data center, each coil associated with at least one fluid loop;
use a first subset of the temperature measurements to determine a blended fluid mix from a primary fluid path and a heated fluid reservoir in order to obtain a predetermined leaving fluid temperature at a first coil of the multiple coils; and
control a position of one or more valves associated with the primary fluid path and the heated fluid reservoir to achieve the determined blended fluid mix.

9. The device of claim 8, wherein the first coil is part of a first fluid loop that includes a close coupled cooling (CCC) coil associated with the data center.

10. The device of claim 8, wherein the processor is further configured to:
use a second subset of the temperature measurements to determine an updated fluid flow rate through a second coil of the multiple coils in order to obtain a predetermined leaving fluid temperature at the second coil; and
control one or more pumps or valve positions associated with the second coil to change a current fluid flow rate to the updated fluid flow rate.

11. The device of claim 10, wherein the second coil is part of a second fluid loop that cools air passing through one or more air handlers that provide cooled air to the data center.

12. The device of claim 10, wherein the processor is further configured to:
use a third subset of the temperature measurements to determine a fluid flow rate from the heated fluid reservoir in order to obtain a predetermined leaving fluid temperature, of fluid in a third fluid loop that travels through a third coil of the multiple coils, in the third coil, wherein the third coil is furthest downstream from the turbine of the multiple coils; and control one or more pumps or valve positions associated with the heated fluid reservoir to change a current fluid flow rate from the heated fluid reservoir to the determined fluid flow rate.

13. The device of claim 8, wherein the processor is further configured to:
use a fourth subset of the temperature measurements to determine if a difference between (i) a temperature of a fluid before entering the first coil and (ii) a temperature of district heat return water is greater than a threshold temperature difference; and
in response to determining that the difference is greater than the threshold temperature difference, control one or more valves associated with a heat exchanger to open in order to divert at least a portion of the fluid to the heat exchanger for thermal transfer with the district heat return water.

14. The device of claim 13, wherein the turbine is a component of the power supply system configured to supply electrical energy to a load in the data center that is cooled by fluid traveling through the first coil.

15. A non-transitory computer readable medium comprising a plurality of instructions that, when executed by at least one processor, is configured to cause the at least one processor to:
receive temperature measurements from multiple temperature sensors in a power supply system that includes multiple coils arranged in a series downstream of a turbine, each coil configured to receive thermal energy from an air stream exhausted from the turbine as the air stream moves toward a data center, each coil associated with at least one fluid loop;
use a first subset of the temperature measurements to determine a blended fluid mix from a primary fluid path and a heated fluid reservoir in order to obtain a predetermined leaving fluid temperature at a first coil of the multiple coils; and
control a position of one or more valves associated with the primary fluid path and the heated fluid reservoir to achieve the determined blended fluid mix.

16. The non-transitory computer readable medium of claim 15, wherein the first coil is part of a first fluid loop that includes a close coupled cooling (CCC) coil associated with the data center.

17. The non-transitory computer readable medium of claim 15, wherein the plurality of instructions is further configured to cause the at least one processor to:
use a second subset of the temperature measurements to determine an updated fluid flow rate through a second coil of the multiple coils in order to obtain a predetermined leaving fluid temperature at the second coil; and
control one or more pumps or valve positions associated with the second coil to change a current fluid flow rate to the updated fluid flow rate.

18. The non-transitory computer readable medium of claim 17, wherein the second coil is part of a second fluid loop that cools air passing through one or more air handlers that provide cooled air to the data center.

19. The non-transitory computer readable medium of claim 17, wherein the plurality of instructions is further configured to cause the at least one processor to:
use a third subset of the temperature measurements to determine a fluid flow rate from the heated fluid reservoir in order to obtain a predetermined leaving fluid temperature, of fluid in a third fluid loop that travels through a third coil of the multiple coils, in the third coil, wherein the third coil is furthest downstream from the turbine of the multiple coils; and
control one or more pumps or valve positions associated with the heated fluid reservoir to change a current fluid flow rate from the heated fluid reservoir to the determined fluid flow rate.

20. The non-transitory computer readable medium of claim 15, wherein the plurality of instructions is further configured to cause the at least one processor to:
use a fourth subset of the temperature measurements to determine if a difference between (i) a temperature of a fluid before entering the first coil and (ii) a temperature of district heat return water is greater than a threshold temperature difference; and
in response to determining that the difference is greater than the threshold temperature difference, control one or more valves associated with a heat exchanger to open in order to divert at least a portion of the fluid to the heat exchanger for thermal transfer with the district heat return water.

* * * * *

UNITED STATES PATENT AND TRADEMARK OFFICE
CERTIFICATE OF CORRECTION

| | |
|---|---|
| PATENT NO. | : 12,287,656 B2 |
| APPLICATION NO. | : 17/805859 |
| DATED | : April 29, 2025 |
| INVENTOR(S) | : Koerner et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 364 days.

Signed and Sealed this
Fifth Day of August, 2025

Coke Morgan Stewart
*Acting Director of the United States Patent and Trademark Office*